United States Patent
Karczewicz et al.

(10) Patent No.: US 11,778,177 B2
(45) Date of Patent: Oct. 3, 2023

(54) ADAPTIVE LOOP FILTER WITH FIXED FILTERS

(71) Applicant: QUALCOMM Incorporated, San Diego, CA (US)

(72) Inventors: Marta Karczewicz, San Diego, CA (US); Nan Hu, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/557,706

(22) Filed: Dec. 21, 2021

(65) Prior Publication Data

US 2022/0201292 A1  Jun. 23, 2022

Related U.S. Application Data

(60) Provisional application No. 63/148,538, filed on Feb. 11, 2021, provisional application No. 63/130,275, filed on Dec. 23, 2020.

(51) Int. Cl.
H04N 19/117  (2014.01)
H04N 19/82  (2014.01)
(Continued)

(52) U.S. Cl.
CPC ......... *H04N 19/117* (2014.11); *H04N 19/124* (2014.11); *H04N 19/132* (2014.11);
(Continued)

(58) Field of Classification Search
CPC .. H04N 19/117; H04N 19/124; H04N 19/132; H04N 19/14; H04N 19/159; H04N 19/176; H04N 19/70
(Continued)

(56) References Cited

U.S. PATENT DOCUMENTS

2014/0037017 A1*  2/2014  Lin .................. H04N 19/80
375/240.29
2017/0237981 A1  8/2017  Karczewicz et al.
(Continued)

FOREIGN PATENT DOCUMENTS

WO  2019182159 A1  9/2019
WO  2020259538 A1  12/2020
(Continued)

OTHER PUBLICATIONS

Chen J., et al., "Algorithm Description for Versatile Video Coding and Test Model 11 (VTM 11)", 20th JVET Meeting, Oct. 7, 2020-Oct. 16, 2020, Teleconference, (The Joint Video Exploration Team of ISO/IEC JTC1/SC29/WG11 and ITU-T SG.16), No. JVET-T2002-v1, 132. MPEG Meeting, Oct. 12, 2020-Oct. 16, 2020, Online, (Motion Picture Expert Group or ISO/IEC JTC1/SC29/WG11), No. m55626, Dec. 14, 2020 (Dec. 14, 2020), XP030293335, pp. 1-102, Retrieved from the Internet: URL: https://jvet-experts.org/doc_end_user/documents/20 [retrieved on Dec. 14, 2020].
(Continued)

*Primary Examiner* — Albert Kir
(74) *Attorney, Agent, or Firm* — Shumaker & Sieffert, P.A.

(57) ABSTRACT

A video decoder can be configured to apply a first stage adaptive loop filter (ALF) to a reconstructed sample by determining a first class index for the reconstructed sample, selecting a filter from a first set of filters based on the first class index, and applying the filter from the first set of filters to the reconstructed sample to determine a first intermediate sample value; apply a second stage ALF to the reconstructed sample by determining a second class index for the reconstructed sample; select a second filter from a second set of filters based on the second class index, applying the second filter to the reconstructed sample to determine a first sample modification value, and determining a second sample modi-
(Continued)

fication value based on the first intermediate sample value; and determine a filtered reconstructed sample based on the reconstructed sample and the first and second sample modification values.

38 Claims, 24 Drawing Sheets

(51) Int. Cl.
   *H04N 19/132* (2014.01)
   *H04N 19/176* (2014.01)
   *H04N 19/159* (2014.01)
   *H04N 19/14* (2014.01)
   *H04N 19/124* (2014.01)
   *H04N 19/70* (2014.01)

(52) U.S. Cl.
   CPC .......... *H04N 19/14* (2014.11); *H04N 19/159* (2014.11); *H04N 19/176* (2014.11); *H04N 19/70* (2014.11)

(58) Field of Classification Search
   USPC ..................................... 375/240.03
   See application file for complete search history.

(56) References Cited

U.S. PATENT DOCUMENTS

| | | | |
|---|---|---|---|
| 2017/0237982 A1 | 8/2017 | Karczewicz et al. | |
| 2017/0238020 A1 | 8/2017 | Karczewicz et al. | |
| 2020/0404339 A1* | 12/2020 | Chernyak | H04N 19/61 |
| 2021/0021820 A1* | 1/2021 | Ikai | G06N 3/063 |
| 2021/0084340 A1* | 3/2021 | Li | H04N 19/132 |
| 2021/0152841 A1 | 5/2021 | Hu et al. | |
| 2022/0030232 A1 | 1/2022 | Hu | |
| 2022/0182680 A1* | 6/2022 | Du | H04N 19/184 |
| 2022/0191551 A1* | 6/2022 | Zhao | H04N 19/593 |

FOREIGN PATENT DOCUMENTS

| | | | |
|---|---|---|---|
| WO | 2021061814 A1 | 4/2021 | |
| WO | 2021083259 A1 | 5/2021 | |

OTHER PUBLICATIONS

International Search Report and Written Opinion—PCT/US2021/064898—ISA/EPO—dated Apr. 25, 2022 14 Pages.

Bross, B., et al., "Versatile Video Coding (Draft 10)," Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020 (Sep. 4, 2020), XP030293002, 551 Pages, Retrieved from the Internet: URL: https://dms.mpeg.expert/doc_enq_user/documents/131 [retrieved on Sep. 4, 2020].

Chang Y-J., et al., "Compression Efficiency Methods Beyond VVC," Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, Jan. 11, 2021-Jan. 15, 2021, Online, (Motion Picture Expert Group or ISO/IEC JTC1/SC29/WG11), No. m5589031 Dec. 2020 (Dec. 31, 2020), XP030290689, pp. 1-13, Retrieved from the Internet: URL:https://dms.mpeg.expert/doc_end_user/documents/133_Teleconference/wg11/m55890-JVET [retrieved on Dec. 31, 2020].

Chen J., et al., "Algorithm Description for Versatile Video Coding and Test Model 2 (VTM 2)," 11. JVET Meeting, Jul. 10, 2018-Jul. 18, 2018, Ljubljana, (The Joint Video Exploration Team of ISO/IEC JTC1/SC29/WG11 and ITU-TSG.16 WP 3), No. JVET-K1002-v1, Aug. 10, 2018 (Aug. 10, 2018), XP030193537, 19 Pages, Retrieved from the Internet: URL: http://phenix.int-evry.fr/jvet/doc_end_user/documents/11_Ljubljana/wg11/JVET-K1002-v1.zip JVET-K1002-v1. docx, [retrieved on Aug. 10, 2018].

Chen J., et al., "Algorithm Description of Joint Exploration Test Model 7 (JEM7)," 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. G1001_v1, JVET-G1001, 7th Meeting, Jul. 13, 2017-Jul. 21, 2017, Torino, IT, Aug. 19, 2017 (Aug. 19, 2017), XP030150980, 48 Pages, pp. i-iv, Retrieved from the Internet: URL: https://phenix.int-evry.fr/jvet/doc_end_user/documents/7_Torino/wg11/JVET-G1001-v1.zip JVET-G1001-v1.docx, [retrieved on Aug. 19, 2017].

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Wiegand T., et al., "WD3: Working Draft 3 of High-Efficiency Video Coding," JCTVC-E603_d5, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 212 Pages.

* cited by examiner

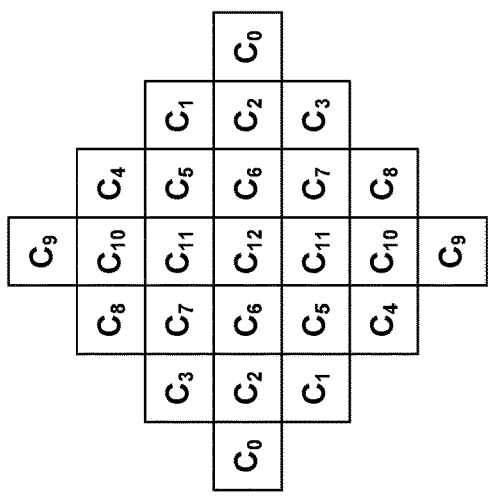
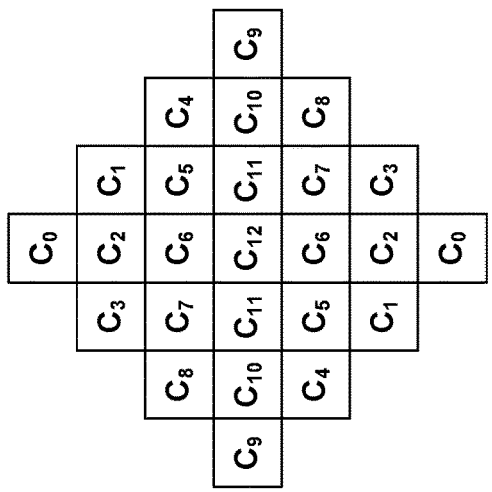
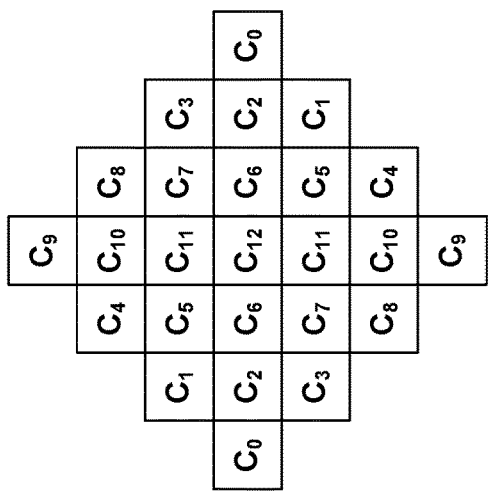
FIG. 6

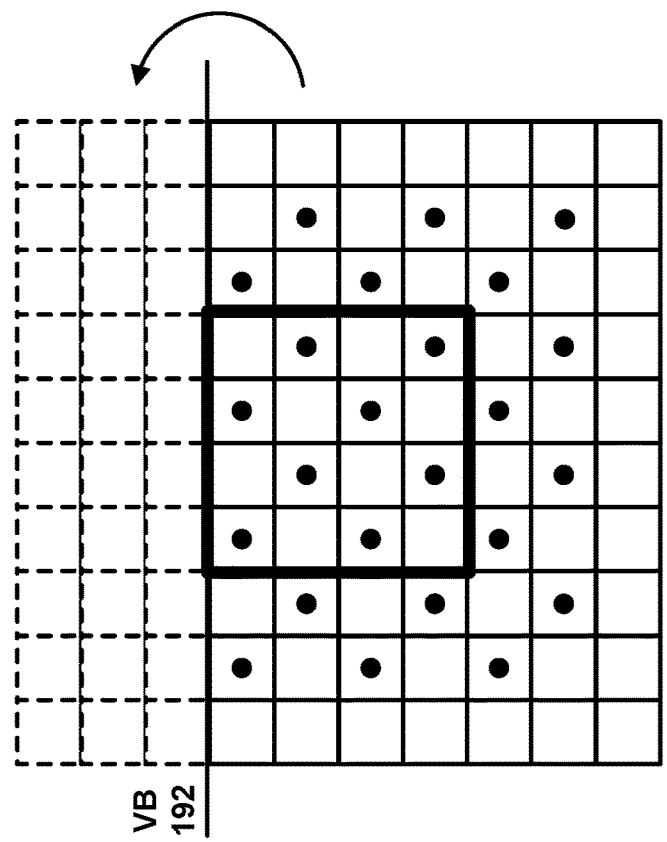
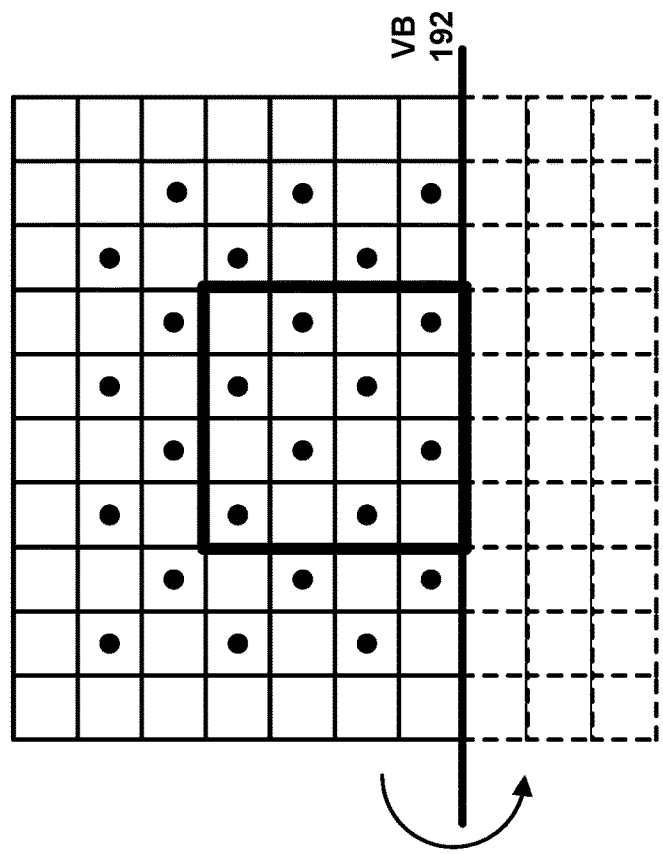
FIG. 8

ADAPTIVE LOOP FILTER WITH FIXED FILTERS

This application claims the benefit of:
U.S. Provisional Patent Application 63/148,538, filed 11 Feb. 2021; and
U.S. Provisional Patent Application 63/130,275, filed 23 Dec. 2020,
the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

According to the techniques of this disclosure, a video decoder may be configured to perform two stages of adaptive loop filtering. For the first stage of the ALF, the video decoder may be configured to determine an activity value and a direction value for a reconstructed sample being filtered. The activity value may generally be indicative of variance in sample values in a neighborhood of samples around the sample being filtered. The direction value may generally be indicative of a direction in which sample values are changing, such as whether sample values are increasing in a horizontal direction, increasing in a vertical direction, increasing in a 45-degree direction, increasing in a 135-degree direction, or not increasing at all. Based on the activity value and the direction value, the video decoder may determine a class index for the sample being filtered. The class index may be associated with a filter from a first set of filters, with each filter being defined by a shape and set of a coefficient values. The video decoder may determine the first set of filters, as well as which classifiers map to which filters, based on syntax included in the bitstream. The video decoder may apply the filter to the reconstructed sample to determine a first intermediate sample value.

For the second stage of the ALF, the video decoder determine a first sample modification value by applying a second filter to the reconstructed sample and determine a second sample modification value based on the first intermediate sample value. The video decoder then determines a filtered reconstructed sample based on the reconstructed sample, the first sample modification value, and the second sample modification value. By applying a first stage ALF to a reconstructed sample of a reconstructed block and applying a second stage ALF to the reconstructed sample as described herein, the techniques of this disclosure may improve the overall quality of decoded video data by accounting for local features of video data better than can be done by a single stage ALF.

According to one example, a method of decoding video data includes applying a first stage adaptive loop filter (ALF) to a reconstructed sample of a reconstructed block, wherein applying the first stage ALF comprises: determining a first class index for the reconstructed sample; selecting a filter from a first set of filters based on the first class index; and applying the filter from the first set of filters to the reconstructed sample to determine a first intermediate sample value; applying a second stage ALF to the reconstructed sample, wherein applying the second stage ALF comprises: determining a second class index for the reconstructed sample; selecting a second filter from a second set of filters based on the second class index; applying the second filter to the reconstructed sample to determine a first sample modification value; determining a second sample modification value based on the first intermediate sample value; and determining a filtered reconstructed sample based on the reconstructed sample, the first sample modification value, and the second sample modification value.

According to one example, a device for decoding video data includes a memory configured to store video data; one or more processors implemented in circuitry and configured to: apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

According to one example, a computer-readable storage medium stores instructions that when executed by one or more processors cause the one or more processors to apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

The details of one or more examples are set forth in the accompanying drawings and the description below. Other features, objects, and advantages will be apparent from the description, drawings, and claims.

BRIEF DESCRIPTION OF DRAWINGS

FIG. 6 is a conceptual diagram illustrating example geometric transformations of 7×7 diamond filter shapes that may be used in accordance with the techniques of this disclosure.

FIG. 8 shows an example of ALF 4×4 sub-block classification that may be used in accordance with the techniques of this disclosure.

DETAILED DESCRIPTION

Figure 1:
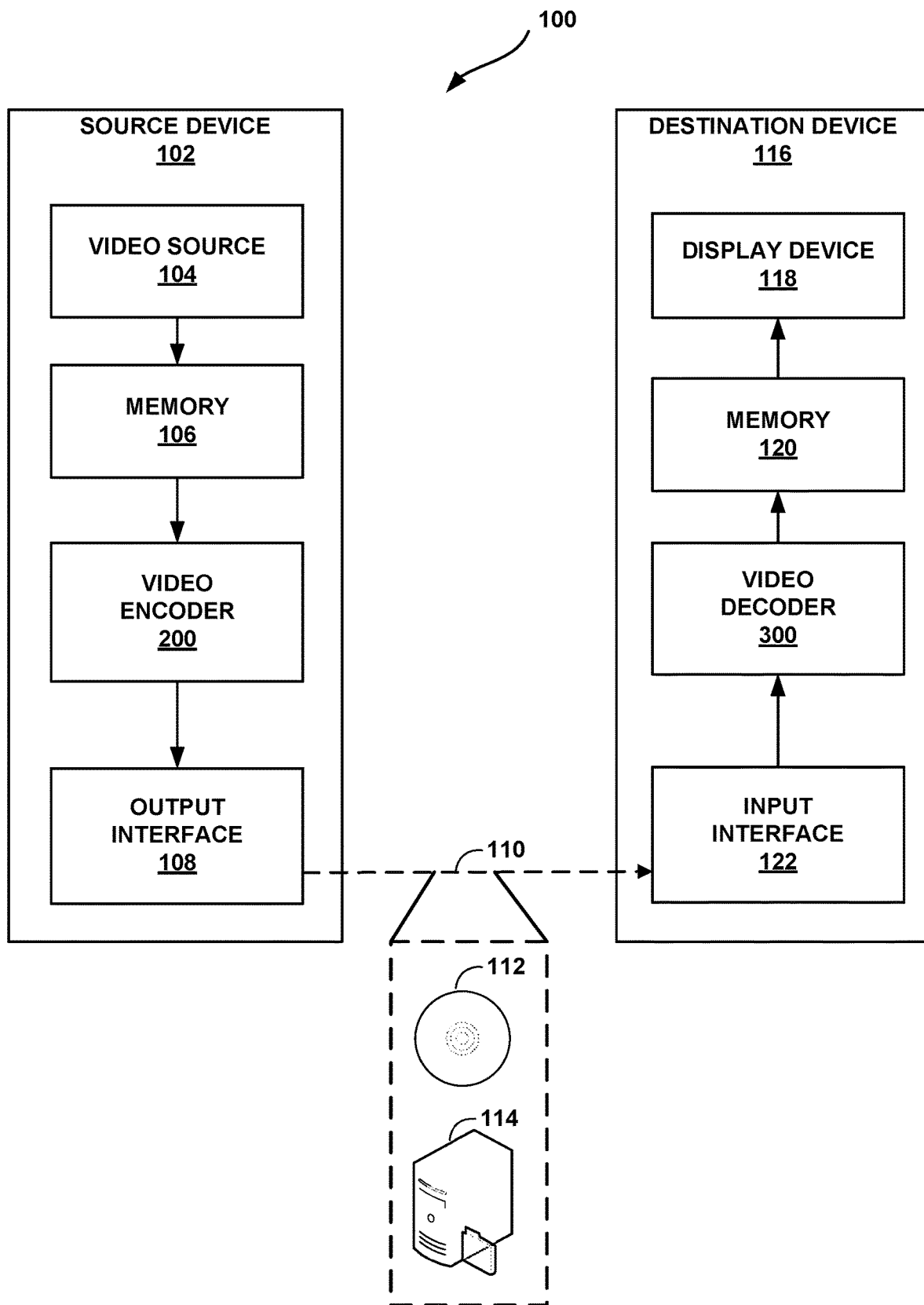
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (i.e., intra prediction) or an already coded block of video data in a different picture (i.e., inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblock filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques associated with filtering reconstructed video data in a video encoding and/or video decoding process and, more particularly, this disclosure describes techniques related to ALF. The described techniques, however, may potentially also be applied to other filtering schemes.

According to the techniques of this disclosure, a video decoder may be configured to perform two stages of adaptive loop filtering. For the first stage of the ALF, the video decoder may be configured to determine an activity value and a direction value for a reconstructed sample being filtered. The activity value may generally be indicative of variance in sample values in a neighborhood of samples around the sample being filtered. The direction value may generally be indicative of a direction in which sample values are changing, such as whether sample values are increasing in a horizontal direction, increasing in a vertical direction, increasing in a 45-degree direction, increasing in a 135-degree direction, or not increasing at all. Based on the activity value and the direction value, the video decoder may determine a class index for the sample being filtered. The class index may be associated with a filter from a first set of filters, with each filter being defined by a shape and set of a coefficient values. The video decoder may determine the first set of filters, as well as which classifiers map to which filters, based on syntax included in the bitstream. The video decoder may apply the filter to the reconstructed sample to determine a first intermediate sample value.

For the second stage of the ALF, the video decoder determine a first sample modification value by applying a second filter to the reconstructed sample and determine a second sample modification value based on the first intermediate sample value. The video decoder then determines a filtered reconstructed sample based on the reconstructed sample, the first sample modification value, and the second sample modification value. By applying a first stage ALF to a reconstructed sample of a reconstructed block and applying a second stage ALF to the reconstructed sample as described herein, the techniques of this disclosure may improve the overall quality of decoded video data by accounting for local features of video data better than can be done by a single stage ALF.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filtering using first and second stages in the manner described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive loop filtering described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices.

For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET- S2001-v17 (hereinafter "VVC Draft 10"). The techniques of this disclosure, however, are not limited to any particular coding standard, and moreover, it is explicitly contemplated the techniques described herein may be used in conjunction with successor standards to VVC.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In video coding, such as in the H.266/VVC standard, ALF is applied to minimize the mean square error between filtered samples and original samples. The input samples for ALF may, for example, be the output samples of SAO. The output samples of ALF may be stored in decoded picture buffer (DPB) or output as viewable pictures. The filter shapes for ALF that were adopted in the joint exploration model (JEM) software were 5×5, 7×7, and 9×9 diamond shapes. The filter shape can be selected and signaled at a picture level in JEM. To get a better trade-off between coding efficiency and filter complexity, in VVC, only 7×7 diamond shape and 5×5 diamond shape are supported for luma and chroma components, respectively.

Figure 2:
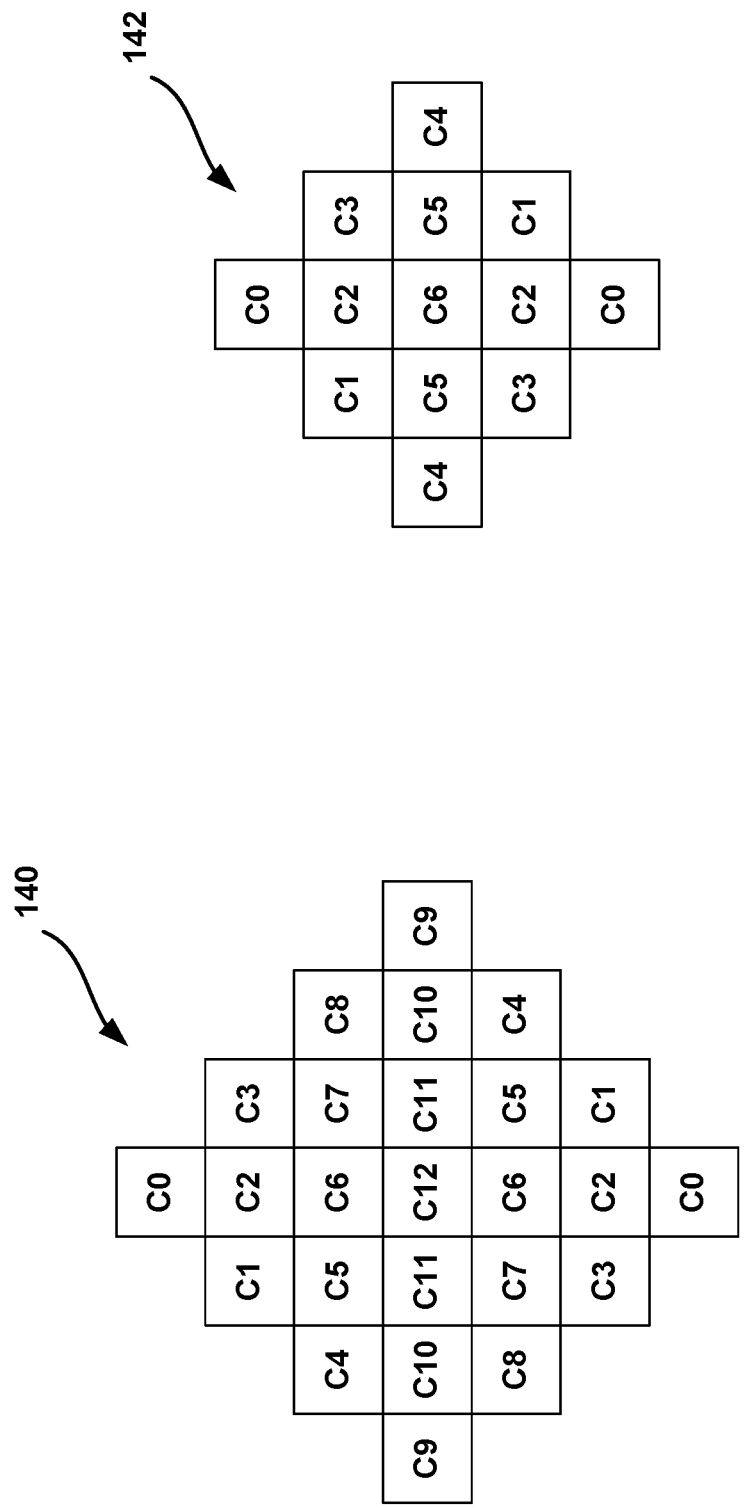
FIGS. 2A and 2B are conceptual diagram illustrating example adaptive loop filter shapes that may be used in accordance with the techniques of this disclosure.

FIG. 2A shows an example filter 140, which is a 7×7 diamond shape filter. FIG. 2B shows an example filter 142, which is a 5×5 diamond shape filter. In each of filters 140 and 142, an integer coefficient $c_i$ is represented with 7-bit fractional precision. The absolute value of $c_i$ is coded by using a $0^{th}$ order Exp-Golomb code followed by a sign bit for a non-zero coefficient. In FIGS. 2A and 2B, each square corresponds to a luma or chroma sample, and the center square corresponds a current to-be-filtered sample. To reduce the overhead of sending coefficients and the number of multiplications, the filter shapes in FIGS. 2A and 2B are point-symmetrical. In addition, as shown in equation (1), the sum of all filter coefficients is set equal to 128, which is the fixed-point representation of 1.0 with 7-bit fractional precision.

$$2\sum_{i=0}^{N-2} c_i + c_{N-1} = 128 \tag{1}$$

In equation (1), N is the number of coefficients, with N being equal to 13 and 7 for 7×7 and 5×5 filter shapes, respectively.

In VVC, nonlinearity is introduced to ALF. A simple clipping function is applied to reduce the impact of a neighboring sample value when the difference between the neighboring sample value and a current to-be-filtered sample value is too large. To filter a sample, ALF may be performed as:

$$\tilde{R}(x, y) = R(x, y) + \left[\sum_{i=0}^{N-2} c_i(f_{i,0} + f_{i,1}) + 64\right] >> 7 \tag{2}$$

where R(x, y) is a sample value after SAO.

The non-linear function is defined with a clipping functions as:

$$f_{i,j} = \min(b_i, \max(-b_i, R(x+x_{i,j}, y+y_{i,j}) - R(x,y))) \tag{3}$$

where j is equal to 0 or 1, and $(x_{i,j}, y_{i,j})$ are filter tap position offsets of ith coefficient $c_i$.

In VVC version 1, as shown in equation (4), the clipping parameter $b_i$ for a coefficient $c_i$, is determined by a clipping index $d_i$. BD is the internal bit depth.

$$b_i = \begin{cases} 2^{BD}, & \text{when } d_i = 0 \\ 2^{BD-1-2d_i}, & \text{otherwise} \end{cases} \tag{4}$$

For a filter, both the number of signaled coefficients and the number of the signaled clipping index are N−1. Each coefficient is limited to the range of [−128, 127], which is equivalent to [−1.0, 1.0] with 7-bit fractional precision. Each clipping index $d_i$ can be 0, 1, 2 or 3 and is signaled by using a two-bit fixed length code. To simplify the clipping operation, as in equation (4), the value of a clipping parameter $b_i$ may be limited to only be a power of 2. Therefore, bit-wise logical operations can be applied as clipping operations.

Figure 3:
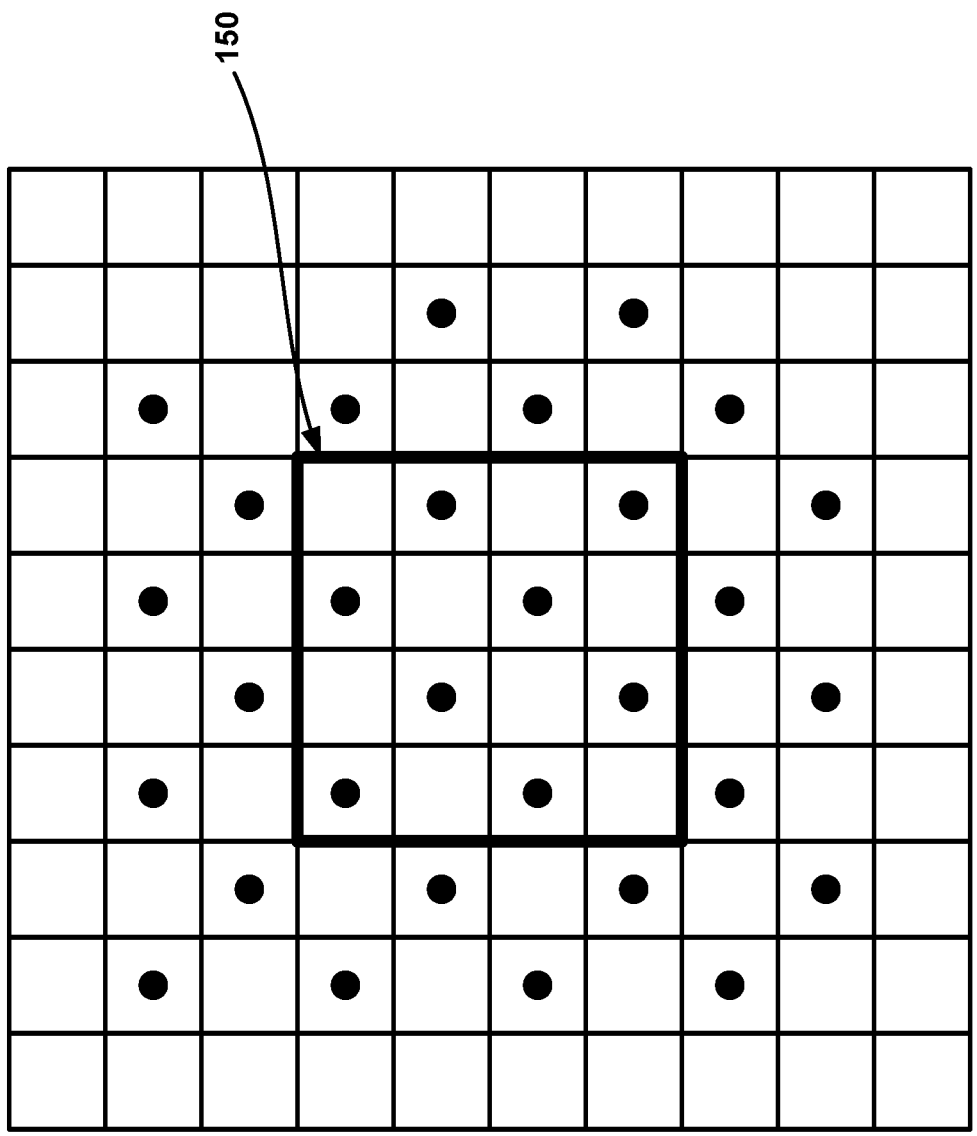
FIG. 3 is a conceptual diagram illustrating example sub-sampled Laplacian values for a 4×4 sub-block adaptive loop filter classification that may be used in accordance with the techniques of this disclosure.

Video encoder 200 and video decoder 300 may be configured to perform sub-block level filter adaptation. In VVC version 1, ALF follows the same luma classification framework as ALF in JEM-7.0. To obtain a better trade-off between coding efficiency and calculation complexity, the block size for classification may be increased to 4×4 samples from 2×2 samples. To determine the class index of a 4×4 block, a surrounding window with 8×8 luma samples is employed to derive direction and activity information. In this 8×8 luma samples window, four gradient values of every second sample are first calculated, as shown in FIG. 3. FIG. 3 illustrates subsampled Laplacian values for a 4×4 sub-block 150 for ALF classification. Gradient values of samples marked with a dot are calculated. Gradient values of other samples are set to 0.

Figure 4:
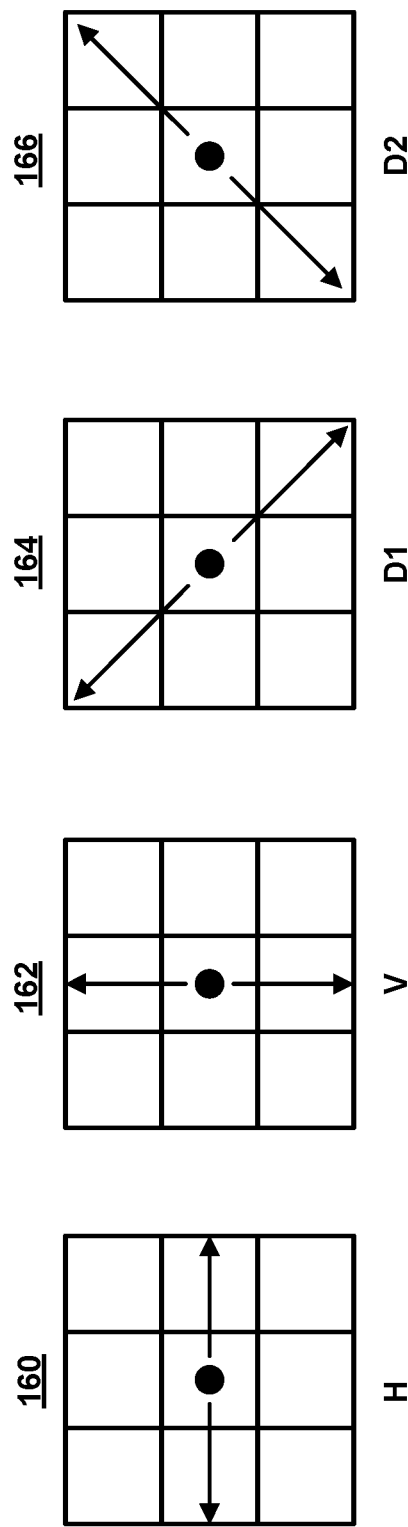
FIG. 4 is a conceptual diagram illustrating example Laplacian values for a luma sample that may be used in accordance with the techniques of this disclosure.

FIG. 4 illustrates the four gradient values for each sample with coordinates (k, l). The dot represents the sample for which the gradient is being calculated. Block 160 illustrates the horizontal gradient (H), and block 162 illustrates the vertical gradient (V). Block 164 illustrates the 135-degree gradient (D1), and block 166 illustrates the 45-degree gradient (D2). H, V, D1, and D2 are derived as follows:

$$H_{k,l} = |2R(k,l) - R(k-1,l) - R(k+1,l)|$$

$$V_{k,l} = |2R(k,l) - R(k,l-1) - R(k,l+1)|$$

$$D1_{k,l} = |2R(k,l) - R(k-1,l-1) - R(k+1,l+1)|$$

$$D2_{k,l} = |2R(k,l) - R(k-1,l+1) - R(k+1,l-1)| \quad (5)$$

Variables i and j can refer to the coordinates of the upper left sample in the 4×4 block. The summation of the calculated horizontal gradient $g_H$, the vertical gradient $g_V$, the 135-degree gradient $g_{D1}$, and the 45-degree gradient $g_{D2}$ is calculated as follows:

$$g_H = \sum_{k=i-2}^{i+5} \sum_{l=j-2}^{j+5} H_{k,l}, \; g_V = \sum_{k=i-2}^{i+5} \sum_{l=j-2}^{j+5} V_{k,l} \quad (6)$$

$$g_{D1} = \sum_{k=i-2}^{i+5} \sum_{l=j-2}^{j+5} D1_{k,l}, \; g_{D2} = \sum_{k=i-2}^{i+5} \sum_{l=j-2}^{j+5} D2_{k,l}$$

A ratio of the maximum and minimum of the horizontal and vertical gradients, denoted by $R_{H,V}$, and the ratio of maximum and minimum of the two diagonal gradients, denoted by $R_{D1,D2}$, are calculated as shown in equation (7).

$$R_{H,V} = \max(g_H, g_V) / \min(g_H, g_V)$$

$$R_{D1,D2} = \max(g_{D1}, g_{D2}) / \min(g_{D1}, g_{D2}) \quad (7)$$

Then, $R_{H,V}$ and $R_{D1,D2}$ are compared to each other with two thresholds $t_1 = 2$ and $t_2 = 4.5$ to derive the directionality D:
Step 1: If both $R_{H,V} \leq t_1$ and $R_{D1,D2} \leq t_1$, D is set to 0 (texture), otherwise continue with Step 2.
Step 2: If $R_{D1,D2} > R_{H,V}$, continue with Step 3, otherwise continue with Step 4.
Step 3: If $R_{D1,D2} \leq t_2$, D is set to 1 (weak diagonal), otherwise, D is set to 2 (strong diagonal).
Step 4: If $R_{H,V} \leq t_2$, D is set to 3 (weak horizontal/vertical), otherwise, D is set to 4 (strong horizontal/vertical).
The activity value A is calculated as follows:

$$A = \left( \sum_{k=i-2}^{i+5} \sum_{l=j-2}^{j+5} (V_{k,l} + H_{k,l}) \right) >> (BD - 2) \quad (8)$$

Figure 5:
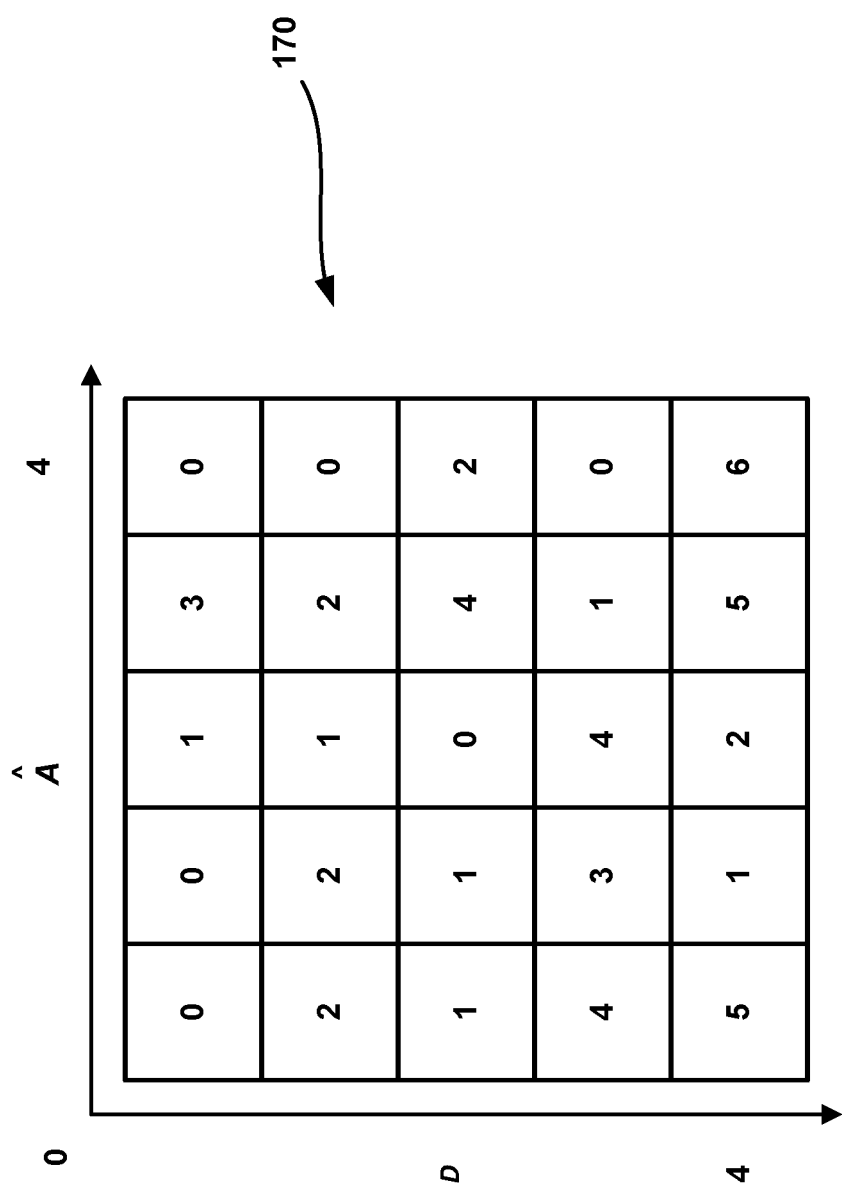
FIG. 5 is a conceptual diagram illustrating an example of adaptive loop filter class merging that may be used in accordance with the techniques of this disclosure.

FIG. 5 shows an example of merging 25 luma classes into 7 merged classes (0 to 6), where each square represents a class based on the values of D and Â. 5×5 grid 170 represents the 25 classes, with the numbers inside each box of 5×5 grid 170 representing the merged class from 0 to 6. Each class, i.e., each square in 5×5 grid 170, can have an index from 0 to 24 inclusive. A is mapped to the range of 0 to 4 inclusive, and the quantized value is denoted as Â. Therefore, each 4×4 block is categorized into one of the 25 classes as follows:

$$C = 5D + Â \quad (9)$$

A luma filter set contains 25 filters. However, to reduce the number of bits required to represent the filter coefficients while maintaining the coding efficiency, different classes can be merged, with the merged classes using the same filters. A merging table is signaled. In the merging table, a filter index for each class is signaled, for example, using a fixed-length code. In the example filter set for FIG. 5, 7 luma filters are signaled. For each class, the filter index (from 0 to 6 in this example) is signaled in an ALF_APS.

After determining a filter from a luma filter set based on class index C of a 4×4 block and the merging table, before filtering the samples of the 4×4 block, a geometric transformation may be applied to the filter depending on gradient values calculated for the 4×4 block as illustrated in Table 1.

TABLE 2

| Geometric transformation based on gradient values | |
| --- | --- |
| Gradient values | Transformation |
| $g_{D2} < g_{D1}$ and $g_H < g_V$ | No transformation |
| $g_{D2} < g_{D1}$ and $g_V \leq g_H$ | Diagonal flip |
| $g_{D1} \leq g_{D2}$ and $g_H < g_V$ | Vertical flip |
| $g_{D1} \leq g_{D2}$ and $g_V \leq g_H$ | Right rotation |

FIG. 6 shows examples of geometric transformations of filter 140 in FIG. 2A. As can be seen in FIG. 6, filter 180 corresponds to a diagonal flip of filter 140. Filter 182 corresponds to a vertical flip of filter 140, and filter 184 corresponds to a right rotation of filter 140.

Video encoder 200 and video decoder 300 may be configured to perform coding tree block level adaptation. In JEM-7.0, only one luma filter set is applied to all luma CTBs of a slice, and only one chroma filter is applied to all chroma CTBs of a slice. However, there are two potential disadvantages. First, when statistic information among CTBs differs by a certain amount, using the same filter or filter set for all CTBs of a color component may limit the coding efficiency of ALF, especially for large-resolution sequences and mixed-content video sequences. Second, when deriving a filter for a slice, a filter cannot be calculated until the statistic information of the entire slice is collected. This multiple-pass coding is not friendly for low-delay applications. To address this problem, one solution is to use statistics from previous coded slices. However, this may result in some performance loss.

In addition to luma 4×4 block level filter adaptation, VVC supports CTB level filter adaption. In a slice, different luma CTBs are allowed to use different luma filter sets, and different chroma CTBs are able to use different chroma filters. CTBs with similar statistics may use the same filters. This CTB level filter adaptation improves coding efficiency, especially for low-delay applications. Additionally, VVC version 1 allows filters from previously coded pictures to be used for CTBs. This temporal filter re-usage mechanism can reduce the overhead of filter coefficient signaling. In VVC version 1, up to seven signaled luma filter sets and eight signaled chroma filters can be applied to a slice. When there are not any signaled filters, one of 16 fixed filter sets can be applied to a luma CTB. When ALF is enabled, the filter set index of either a fixed filter set or a signaled luma filter set is signaled for a luma CTB. The filter index of a signaled chroma filter is signaled for a chroma CTB. By using filters signaled from previously coded pictures and fixed filters, when encoding a current CTU in a low delay application, three CTU-level on/off flags and a filter/filter set index can be determined by only using the statistic information of a current CTU. Therefore, the encoded bitstream of each CTU can be generated on the fly and without waiting for the availability of the statistics of the whole picture.

Video encoder 200 and video decoder 300 may be configured to perform techniques for line buffer reduction. As shown in FIGS. 2A and 2B, in the vertical direction, the filter shapes have 7 taps and 5 taps for luma and chroma components, respectively. As a result, in VVC Test Model 2.0 (VTM-2.0), when decoding a row of CTUs, due to the delay of the deblocking filter and SAO filter, 7 luma lines and 4 chroma lines of the upper CTU row must be stored in a line buffer for ALF. However, the extra line buffers require large chip areas, especially for high-definition (HD) and ultra-high-definition (UHD) video sequences.

To make ALF hardware friendly (e.g., by reducing line buffer requirements), the concept of a virtual boundary (VB) may be applied to remove all the line buffer overhead for ALF. Considering the deblocking filter and SAO filter in VVC version 1, the position of a VB is 4 luma samples and 2 chroma samples above a horizontal CTU boundary. When one sample on one side of a VB is filtered, the samples on the other side of the VB cannot be utilized, and modified filtering with symmetrical sample padding may be applied.

Figure 7A:
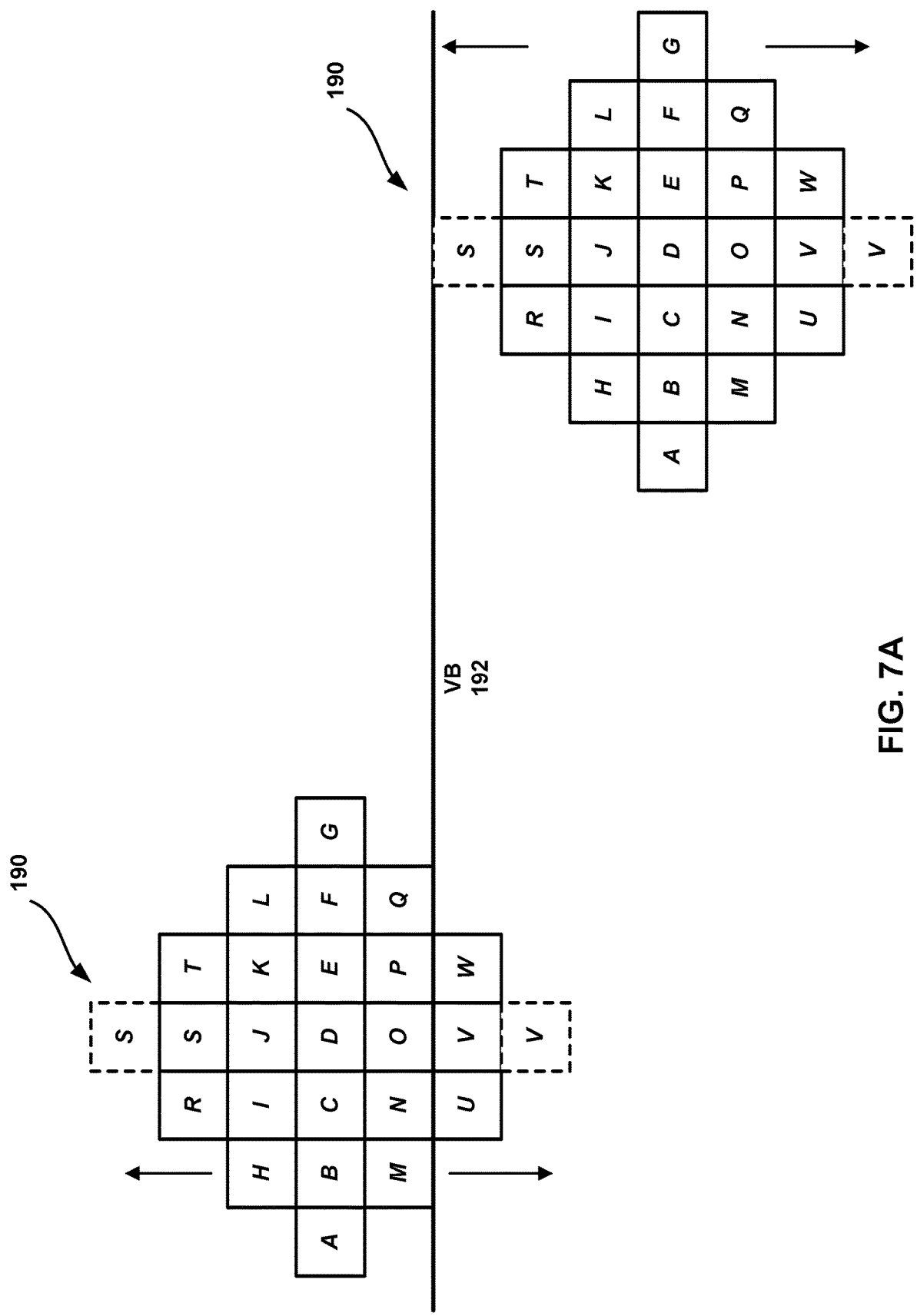
FIGS. 7A-7C show examples of symmetrical sample padding in ALF that may be used in accordance with the techniques of this disclosure.
Figure 7B:
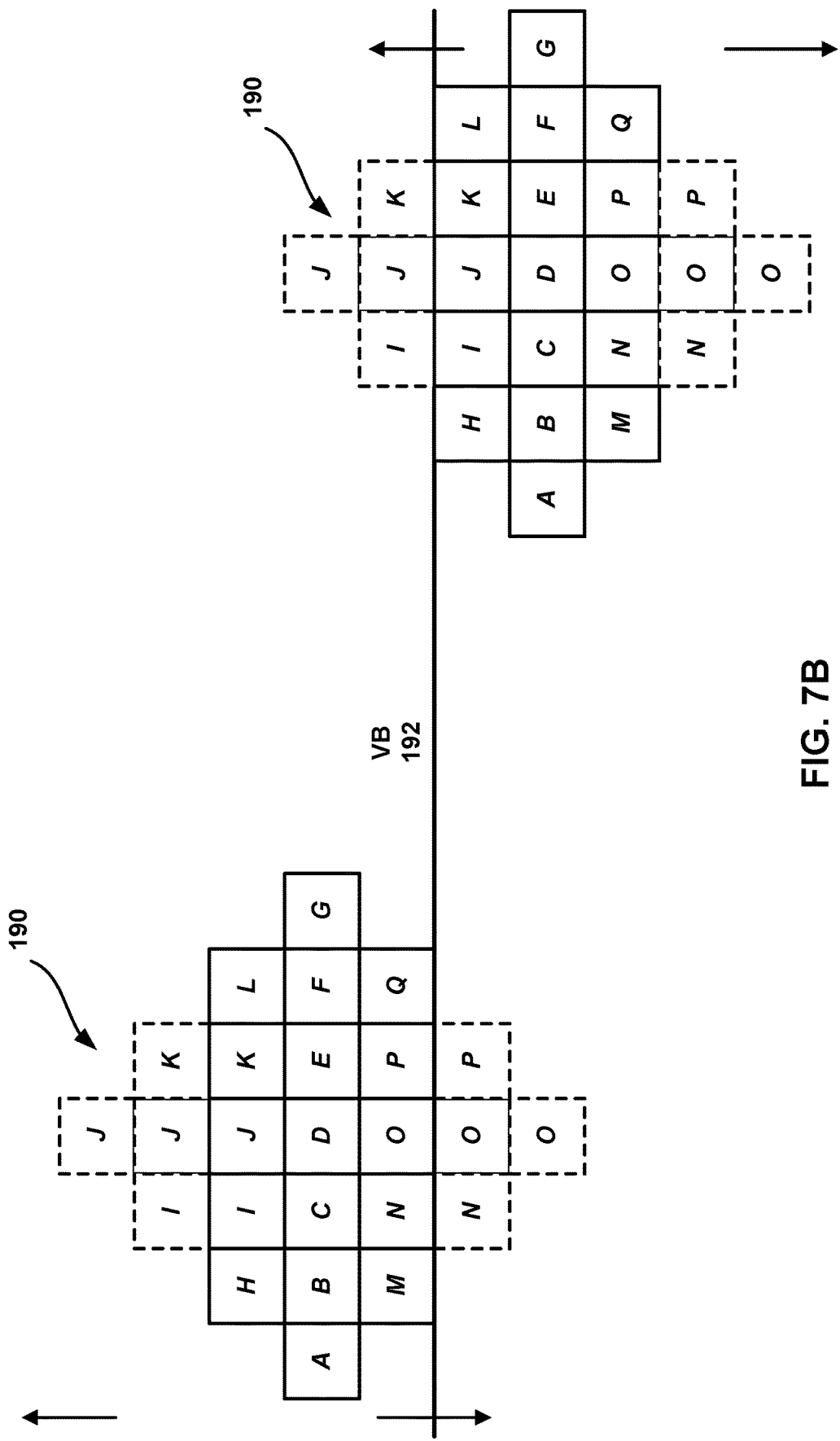
Figure 7C:
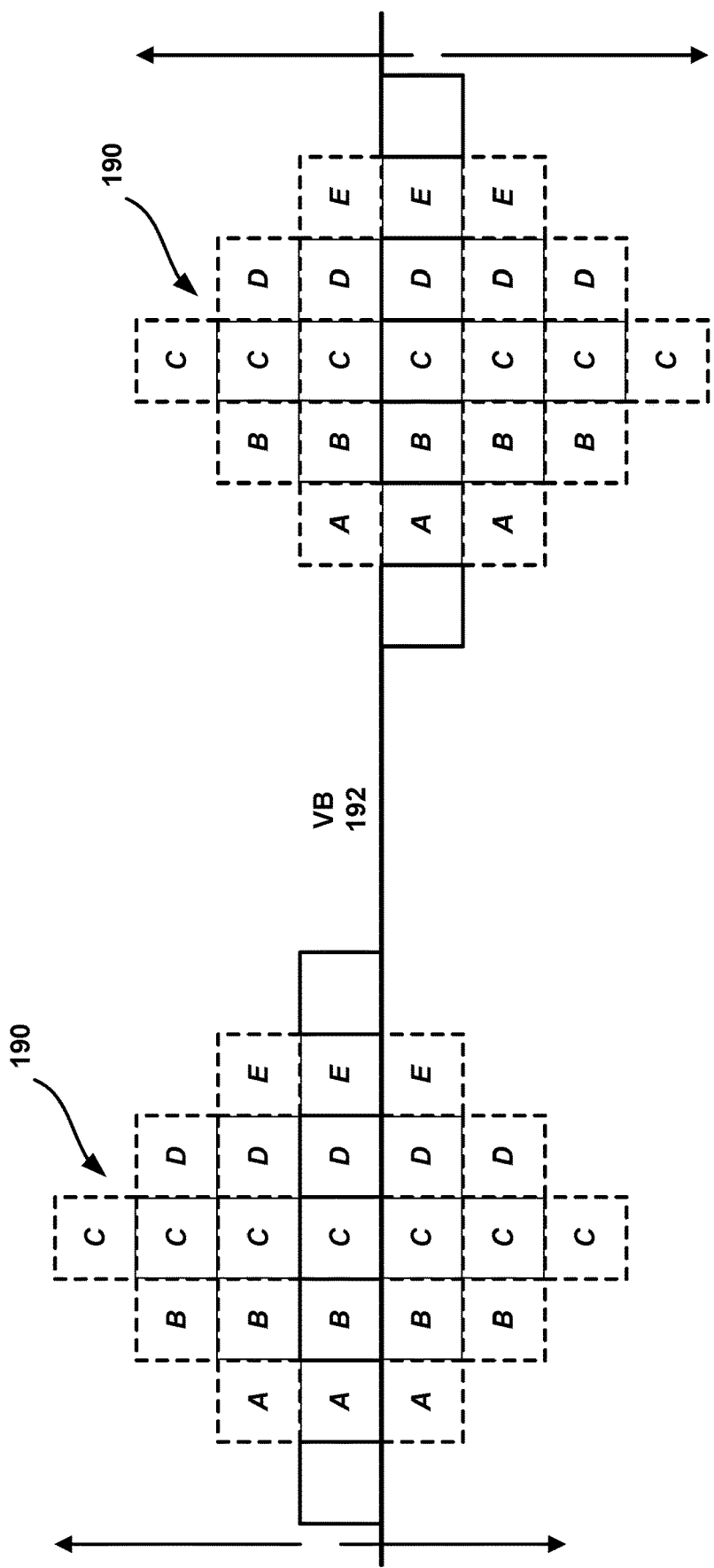

FIGS. 7A-7C show examples of symmetrical sample padding for luma ALF filtering at an ALF VB. In the examples of FIGS. 7A-7C, the center square of filter 190 is the position of a current, to-be-filtered sample, and the bold line is the position of a VB (VB 192). In FIGS. 7A-7C, the filter tap locations with dashed lines are padded. FIG. 7A shows an example where one filter tap location of filter 190 is above or below VB 192. In this example, one filter tap location is padded. FIG. 7B shows an example where four filter tap locations of filter 190 are above or below VB 192. In this example, four filter tap locations are padded.

However, when a sample is on the closest row on each side of VB 192, as shown in FIG. 7C, the 2D filter is equivalent to a horizontal filter. This may introduce visual artifacts. To address this problem, the filter strength may be compensated when the current, to-be-filtered sample is located on the closest row on each side of a VB, as shown in equation (10). Comparing equation (10) with equation (2), it can be seen that 3 more bits are right shifted.

$$\tilde{R}(x, y) = R(x, y) + \left[\sum_{i=0}^{N-2} c_i(f_{i,0} + f_{i,1}) + 512\right] >> 10 \quad (10)$$

When VB processing is applied, the classification of a 4×4 block may also be modified. When calculating the class index of a 4×4 block on one side of a VB, the gradients and samples on the other side of the VB may not be used, as shown in FIG. 8.

FIG. 8 shows an example of ALF 4×4 sub-block classification at an ALF VB. When calculating gradient values of samples adjacent to a VB, the samples on the other side of the VB cannot be utilized. Therefore, the boundary samples of the current side are repetitively extended, as shown in FIG. 8. That is, the boundary samples on the current side of the VB are mirrored to the other side of the VB. As the number of available gradient values is reduced, the activity derivation in equation (8) is re-scaled to:

$$A = \left(\sum_{k=i-2}^{i+5} \sum_{l=j-2}^{j+5} (V_{k,l} + H_{k,l}) * 3\right) >> (BD - 1) \quad (11)$$

Video encoder 200 and video decoder 300 may be configured to perform filter coefficient signaling. In VVC version 1, ALF coefficients are signaled in ALF adaptation parameter sets (APS). One APS may contain one set of luma filters with up to 25 filters, up to 8 chroma filters and up to 8 cross-component ALF (CC-ALF) filters. Each set of luma filters support applying ALF to the luma 25 classes. In VVC version 1, up to 8 ALF_APSs are supported.

Table 2 below shows an example syntax signal table for signaling filter coefficients in accordance with the techniques of this disclosure.

TABLE 2

| | Descriptor |
|---|---|
| alf_data( ) { | |
|   alf_luma_filter_signal_flag | u(1) |
|   if( aps_chroma_present_flag ) { | |
|     alf_chroma_filter_signal_flag | u(1) |
|     alf_cc_cb_filter_signal_flag | u(1) |
|     alf_cc_cr_filter_signal_flag | u(1) |
|   } | |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|   if( alf_luma_coeff_abs[ sfIdx ][ j ] ) | |
|     alf_luma_coeff_sign[ sfIdx ][ j ] | u(1) |
|     } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |

TABLE 2-continued

| | Descriptor |
|---|---|
| ``for( altIdx = 0; altIdx <= alf_chroma_num_alt_filters_minus1; altIdx++ )``<br>``{``<br>`` for( j = 0; j < 6; j++ ) {``<br>``  alf_chroma_coeff_abs[ altIdx ][ j ]`` | ue(v) |
| ``  if( alf_chroma_coeff_abs[ altIdx ][ j ] > 0 )``<br>``   alf_chroma_coeff_sign[ altIdx ][ j ]`` | u(1) |
| `` }``<br>`` if( alf_chroma_clip_flag )``<br>``  for( j = 0; j < 6; j++ )``<br>``   alf_chroma_clip_idx[ altIdx ][ j ]`` | u(2) |
| `` }``<br>``}``<br>``if( alf_cc_cb_filter_signal_flag ) {``<br>`` alf_cc_cb_filters_signalled_minus1`` | ue(v) |
| ``for( k = 0; k < alf_cc_cb_filters_signalled_minus1 + 1; k++ ) {``<br>`` for( j = 0; j < 7; j++ ) {``<br>``  alf_cc_cb_mapped_coeff_abs[ k ][ j ]`` | u(3) |
| ``  if( alf_cc_cb_mapped_coeff_abs[ k ][ j ] )``<br>``   alf_cc_cb_coeff_sign[ k ][ j ]`` | u(1) |
| `` }``<br>``}``<br>``}``<br>``if( alf_cc_cr_filter_signal_flag ) {``<br>`` alf_cc_cr_filters_signalled_minus1`` | ue(v) |
| `` for( k = 0; k < alf_cc_cr_filters_signalled_minus1 + 1; k++ ) {``<br>``  for( j = 0; j < 7; j++ ) {``<br>``   alf_cc_cr_mapped_coeff_abs[ k ][ j ]`` | u(3) |
| ``   if( alf_cc_cr_mapped_coeff_abs[ k ][ j ] )``<br>``    alf_cc_cr_coeff_sign[ k ][ j ]`` | u(1) |
| ``  }``<br>`` }``<br>``}``<br>``}`` | |

This disclosure describes techniques that may further improve the performance of ALF. For example, in VVC, when filtering a sample, only one classifier and one filter can be applied. However, this disclosure described techniques for applying multiple classifiers and filters to capture more local features. This disclosure describes techniques for a framework to use multiple filters and classifiers to filter a sample.

Figure 9:
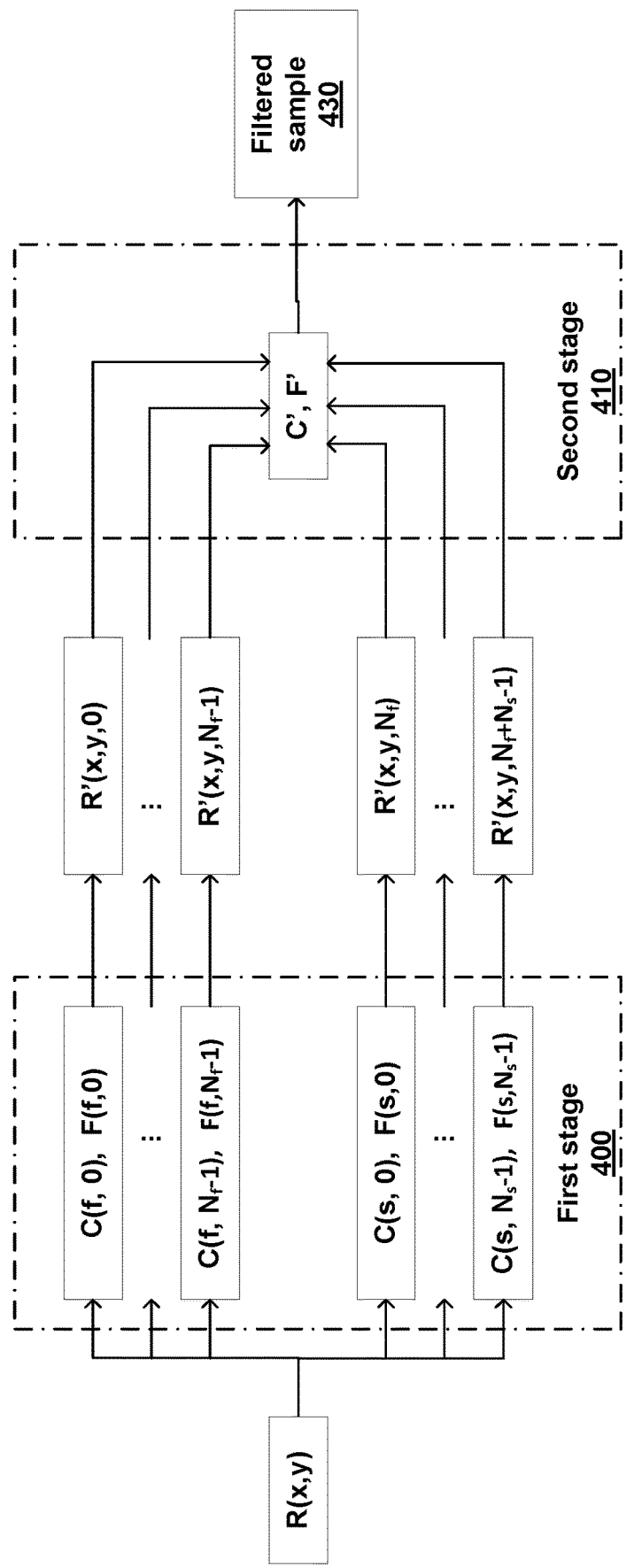
FIG. 9 shows an example framework for using multiple fixed filter sets and multiple signaled filter sets to filter a reconstructed sample of video data in accordance with the techniques of this disclosure.

FIG. 9 shows an example framework for using multiple fixed filter sets and multiple signaled filter sets to filter a reconstructed sample of video data. Video encoder 200 and video decoder 300 may be configured to implement multiple fixed filters and multiple signaled filters in accordance with the techniques of FIG. 9. The techniques of FIGS. 10-15 will be described with respect to video decoder 300 but may also be performed by video encoder 200.

In the example of FIG. 9, video decoder 300 applies first stage ALF 400 to reconstructed sample R(x,y) to determine intermediate filtered signal R'. Video decoder 300 then applies second stage ALF 410 to R' to determine a value for filtered sample 430.

Aspects of first stage ALF 400 will now be described in more detail.

$N_s$ and $N_f$ denote numbers of signaled filter sets and fixed (pre-defined) filter sets, that may be applied to a sample. Rs are the input samples to ALF.

F(f, i) with i=0 . . . $N_f$−1 denotes the ith fixed filter set
C(f, i) with i=0 . . . $N_f$−1 denotes the classifier for the ith fixed filter set. Through C(f, i), for each sample, the filter index is calculated. Based on the filter index, a filter from the fixed filter set F(f, i) is chosen to filter that sample. In addition, C(f, i) determines how to apply the geometric transformation to the coefficients.
F(s, i) with i=0 . . . $N_s$−1 denotes the ith signaled filter set
C(s, i) with i=0 . . . $N_s$−1 denotes the classifier with ith signaled filter set. Through C(s, i), for each sample, the filter index is calculated. Based on the filter index, a filter from the fixed filter set F(s, i) is chosen to filter that sample. In addition, C(s, i) determines how to apply the geometric transformation to the coefficients.

For a reconstructed sample R(x, y), by using the reconstructed sample itself and neighboring samples, video decoder 300 may apply multiple filter sets. Given a filter set (which could be a fixed filter set or a signaled filter set), a classifier maybe applied. The classifier determines which filter from the filter set may be applied and how to transpose the filter coefficients. After the first stage, for each filter set and the corresponding classifier, an intermediately filtered signal R' may be calculated, for example as, $$R'(x, y, i) = R(x, y) + \left[\sum_{j=0}^{N_i-2} c_{i,j}(f_{i,j,0} + f_{i,j,1})\right] \quad (12)$$

For ith filter, with i=0 . . . $N_f+N_s-1$, $c_{i,j}$ is the jth coefficient of the chosen filter from the ith filter set, Ni is the number of coefficients and $f_{i,j,k}$ with k=0 or 1 is a function of one neighboring sample and current sample, for example, $f_{i,j,k}$ may be implemented as clipping function as in VVC $$f_{i,j,k} = \min(b_{i,j}, \max(-b_{i,j}, R(x+x_{i,j,k}, y+y_{i,j,k})-R(x,y))) \quad (13)$$

$(x_{i,j,k}, y_{i,j,k})$ is the coordinate offset of a neighboring sample, relative to the current sample.

Figures 10A, 10B, 10C:
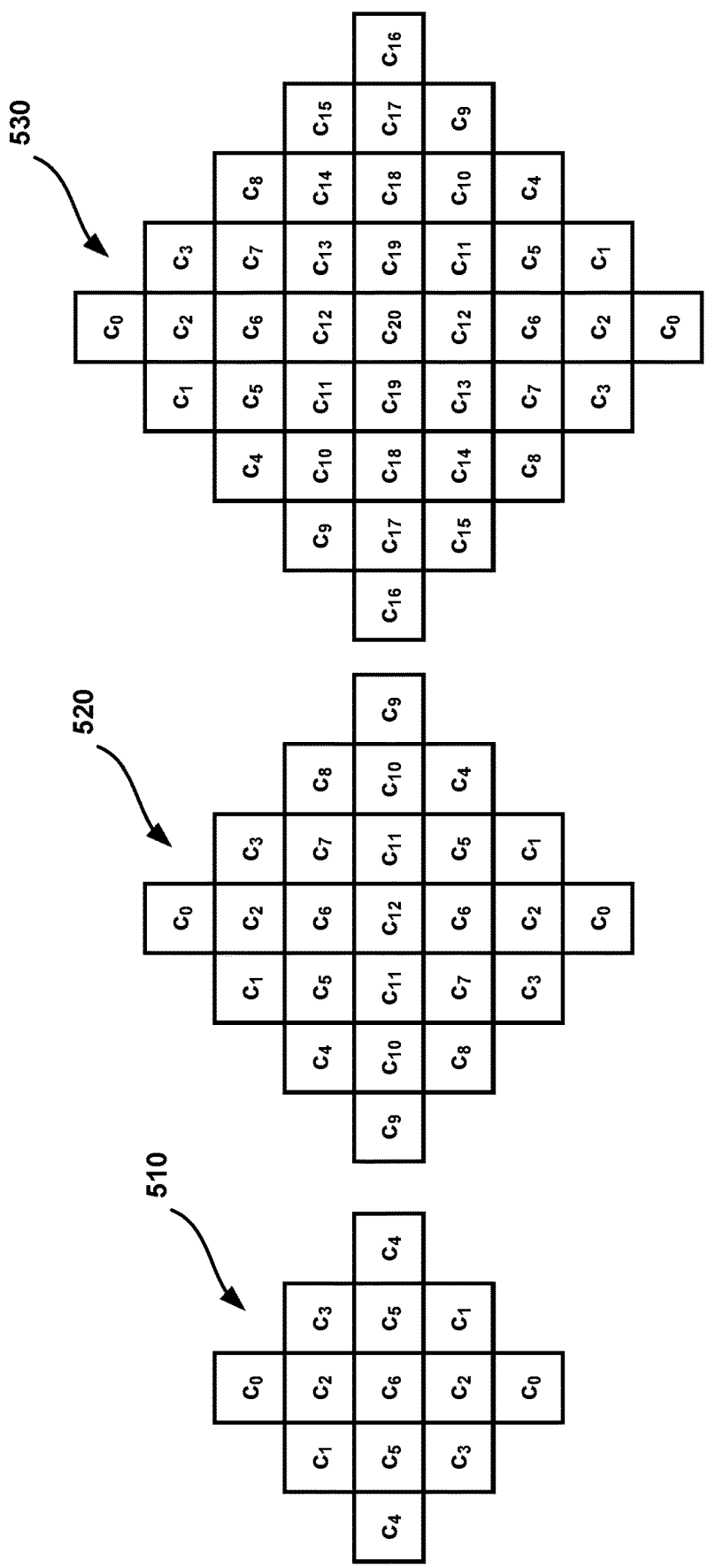
FIGS. 10A-10E shows examples of 5×5, 7×7, 9×9, 11×11 and 13×13 filters that may be used in accordance with the techniques of this disclosure.
Figure 10E:
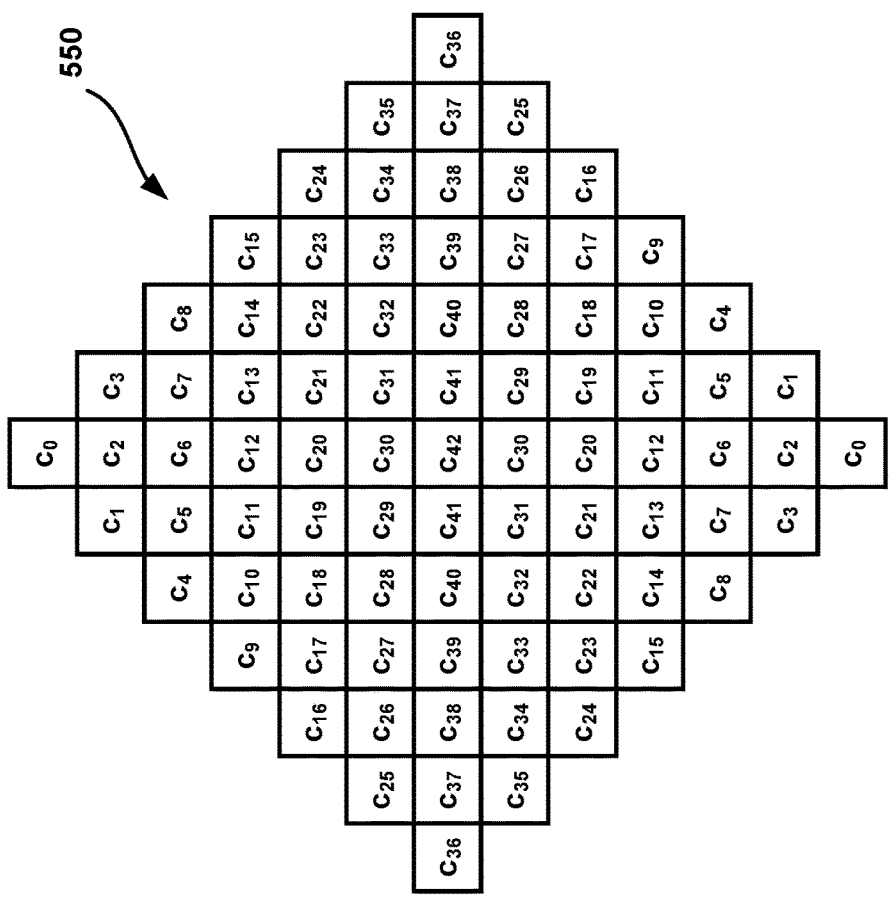
Figure 10D:
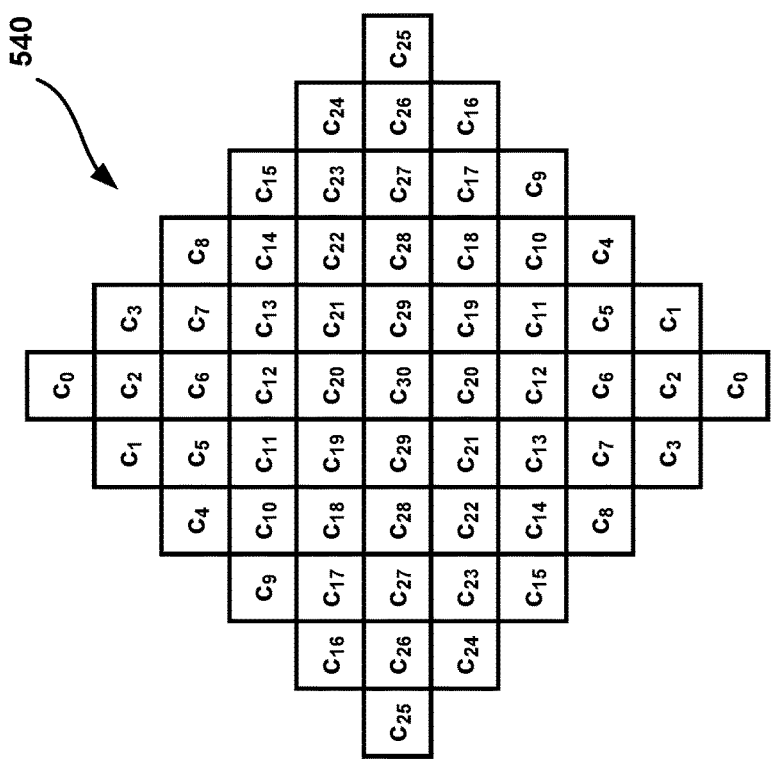

In some examples, the filter shapes of a fixed filter or a signaled filter may be 5×5, 7×7, 9×9, 11×11 and 13×13. FIG. 10A shows an example of filter 510, which is a 5×5 diamond filter shape, and FIG. 10B shows an example of filter 520, which is a 7×7 diamond filter shape. FIG. 10C shows an example of filter 530, which is a 9×9 diamond filter shape, and FIG. 10D shows an example of filter 540, which is an 11×11 diamond filter shape. FIG. 10E shows an example of filter 550, which is a 13×13 diamond filter shape.

In one example, video decoder 300 may be configured to determine a classifier C(f/s, i), activity and direction values based on 2-D Laplacian/gradient values. The classifier may be applied to each sample or a block. When a classifier is applied to a block, all samples in the block have the same class index and the same transpose type. For example, $w_i$ can denote the width of a block, $h_i$ can denote height of the block and (x, y) can denote the coordinates of the top-left sample of the block.

For a sample with coordinates (k, l), four Laplacian (gradient) values: horizontal gradient H, vertical gradient V, 135-degree gradient D1 and 45-degree gradient D2 may derived as $$H_{k,l} = |2R(k,l) - R(k-1,l) - R(k+1,l)|$$

$$V_{k,l} = |2R(k,l) - R(k,l-1) - R(k,l+1)|$$

$$D1_{k,l} = |2R(k,l) - R(k-1,l-1) - R(k+1,l+1)|$$

$$D2_{k,l} = |2R(k,l) - R(k-1,l+1) - R(k+1,l-1)| \quad (14)$$

Video decoder 300 may be configured to derive the activity value $A_i$ by using vertical and horizontal gradients as:

$$A_i = \left( \sum_{k=x-a_i}^{x+w_i+a_i-1} \sum_{l=y-b_i}^{y+h_i+b_i-1} (V_{k,l} + H_{k,l}) \right) \quad (15)$$

where $a_i$ and $b_i$ are the window sizes in horizontal and vertical directions for classifier C(f/s, i), respectively.

Video decoder 300 may be configured to quantize $A_i$ to the range of 0 to $M_{A,i}-1$ inclusive. The quantized value is denoted as $\hat{A}_i$.

Video decoder 300 may be configured to determine a direction using a horizontal gradient H, a vertical gradient V, a 135-degree gradient D1, and a 45-degree gradient D2.

Video decoder 300 may be configured to first calculate values of horizontal gradient $g_{i,H}$, vertical gradient $g_{i,V}$, and two diagonal gradients, $g_{i,D1}$ and $g_{i,D2}$, as follows:

$$g_{i,H} = \sum_{k=x-a_i}^{x+w_i+a_i-1} \sum_{l=y-b_i}^{y+h_i+b_i-1} H_{k,l}, \quad g_{i,V} = \sum_{k=x-a_i}^{x+w_i+a_i-1} \sum_{l=y-b_i}^{y+h_i+b_i-1} V_{k,l},$$

$$g_{i,D1} = \sum_{k=x-a_i}^{x+w_i+a_i-1} \sum_{l=y-b_i}^{y+h_i+b_i-1} D1_{k,l}, \quad g_{i,D2} = \sum_{k=x-a_i}^{x+w_i+a_i-1} \sum_{l=y-b_i}^{y+h_i+b_i-1} D2_{k,l}, \quad (16)$$

To assign the directionality $D_i$, video encoder 200 and video decoder 300 may be configured to derive the maximum and minimum of the horizontal and vertical gradients, the maximum and minimum of the two diagonal gradients as follows:

$$g_{i,h,v}^{max} = \max(g_{i,H}, g_{i,V}), g_{i,h,v}^{min} = \min(g_{i,H}, g_{i,V}) \quad (17)$$

$$g_{i,D1,D2}^{max} = \max(g_{i,D1}, g_{i,D2}), g_{i,D1,D2}^{min} = \min(g_{i,D1}, g_{i,D2}) \quad (18)$$

Then direction $D_i$ may be derived as the same as VVC, with number of directions $M_{D,i}=5$:

Step 1. If both $g_{i,h,v}^{max} \leq t_1 \cdot g_{i,h,v}^{min}$ and $g_{i,D1,D2}^{max} \leq t_1 \cdot g_{i,D1,D2}^{min}$, $D_i$ is set to 0 (block is categorized as "texture").
Step 2. If $g_{i,h,v}^{max}/g_{i,h,v}^{min} > g_{i,D1,D2}^{max}/g_{i,D1,D2}^{min}$, continue from Step 3, otherwise continue from Step 4.
Step 3. If $g_{i,h,v}^{max} > t_2 \cdot g_{i,h,v}^{min}$, $D_i$ is set to 2 (block is categorized as "strong horizontal/vertical"), otherwise $D_i$ is set to 1 (block is categorized as "weak horizontal/vertical").
Step 4. If $g_{i,D1,D2}^{max} > t_2 \cdot g_{i,D1,D2}^{min}$, $D_i$ is set to 4 (block is categorized as "strong diagonal"), otherwise $D_i$ is set to 3. (block is categorized as "weak diagonal").

In some examples, more directions may be supported.

Video decoder 300 may be configured to calculate edge strengths of horizontal/vertical directions ($ES_{i,HV}$) by comparing the ratio $g_{i,h,v}^{max}/g_{i,h,v}^{min}$ to an array of thresholds (Th). The size of the array of thresholds is represented b S, and the thresholds are sorted ascendingly. The number of directions is $M_{D,i}=(S+1)*(S+2)$ Step 1. Initialize m=0 and $ES_{i,HV}=0$;
Step 2. If m is equal to S, stop; otherwise, go to Step 3.
Step 3. if $g_{i,h,v}^{max}/g_{i,h,v}^{min} > Th[m]$, m=m+1 and $ES_{i,HV}=ES_{i,HV}+1$, go to Step 2;
otherwise, stop.

Video decoder 300 may be configured to calculate a diagonal direction directions ($E_{i,D}$) as follows:
Step 1. Initialize m=0 and $E_{i,D}=0$;
Step 2. If m is equal to S, stop; otherwise, go to Step 3.
Step 3. if $g_{i,D1,D2}^{max}/g_{i,D1,D2}^{min} > Th[m]$ m=m+1 and $E_{i,D}=E_{i,D}+1$, go to Step 2; otherwise, stop.

An example of the array of thresholds is Th=[1.25, 1.5, 2, 3, 4.5, 8] and S=6.

Video decoder 300 may be configured to determine a major edge strength ($ES_M$) and a secondary edge strength ($ES_S$) as follows:

If $g_{i,h,v}^{max}/g_{i,h,v}^{min} > g_{i,D1,D2}^{max}/g_{i,D1,D2}^{min}$, $ES_M$ is set as $ES_{HV}$ and $ES_S$ is set as $ES_D$; otherwise, $ES_M$ is set as $ES_D$ and $ES_S$ is set as $ES_{HV}$ If $ES_S$ is larger than $ES_M$, $D_i$ is set to 0. Otherwise, if $g_{i,h,v}^{max}/g_{i,h,v}^{min} > g_{i,D1,D2}^{max}/g_{i,D1,D2}^{min}$, $D_i=ES_M*(ES_M+1)/2+ES_S$; else, $D_i=ES_M*(ES_M+1)/2+ES_S+M_{D,i}/2$ Video decoder 300 may be configured to derive class index $C_i$ as $C_i=\hat{A}_i*M_{D,i}+D_i$ Based on $C_i$, video encoder 200 and video decoder 300 may be configured to select a filter from the filter set F(f/s, i).

Aspects of second stage ALF 410 will now be described in more detail. At second stage ALF 410, F' is a filter set and C' is the corresponding classifier. The intermediate filtered results may be further filtered with current sample and its neighbors. C' may be used to determine which filter in F' is applied and how to transpose the coefficients. In one example, F' may be a signaled filter set or a fixed (predefined) filter set. In one example, C' may use the Rs and/or R's to determine the filter index for filter set F' by calculating activity and directions in the same way as the first stage. Transpose may be applied when applying F'.

A fixed filter set F(f, i) and the corresponding classifier C(f, i) may be selected from one or more candidate fixed filter sets. In one example, given an i, there may be some candidate fixed filter sets for fixed filter set F(f, i) and classifier C(f, i). And the fixed filter set F(f, i) and classifier C(f, i) may be chosen based on coding information, such as picture/CTU/CU/PU/TU size, quantization parameter (QP), number of non-zero quantized coefficients, motion vectors, window size ($a_i, b_i$) and so on. In some examples, for each F(f, i), a syntax element may be signaled to indicate which fixed filter set is used out of the candidate fixed filter sets for ith fixed filter set. The syntax element may be signaled as part of an SPS, PPS, VPS, APS, picture header (PH), slice header (SH), sub-picture, CTU, or block. In some examples, all these syntax elements may have the same value and only one syntax element is needed to be signaled. In some examples, only one candidate fixed filter set may be available for F(f, i), so no syntax element is needed to be signaled.

In one example, $N_s$ and $N_f$ may be determined implicitly or signaled explicitly at high level, such as SPS, VPS, APS, PH, SH, CTU, or sub-block level.

Video decoder 300 may be configured to implement multiple fixed filters and one signaled filter. In another example, to reduce the bit stream signaling overhead, while maintaining the adaptivity, video encoder 200 and video decoder 300 may be configured to filter a current sample use only one signaled filter with multiple fixed filters, as shown in FIG. 11.

Figure 11:
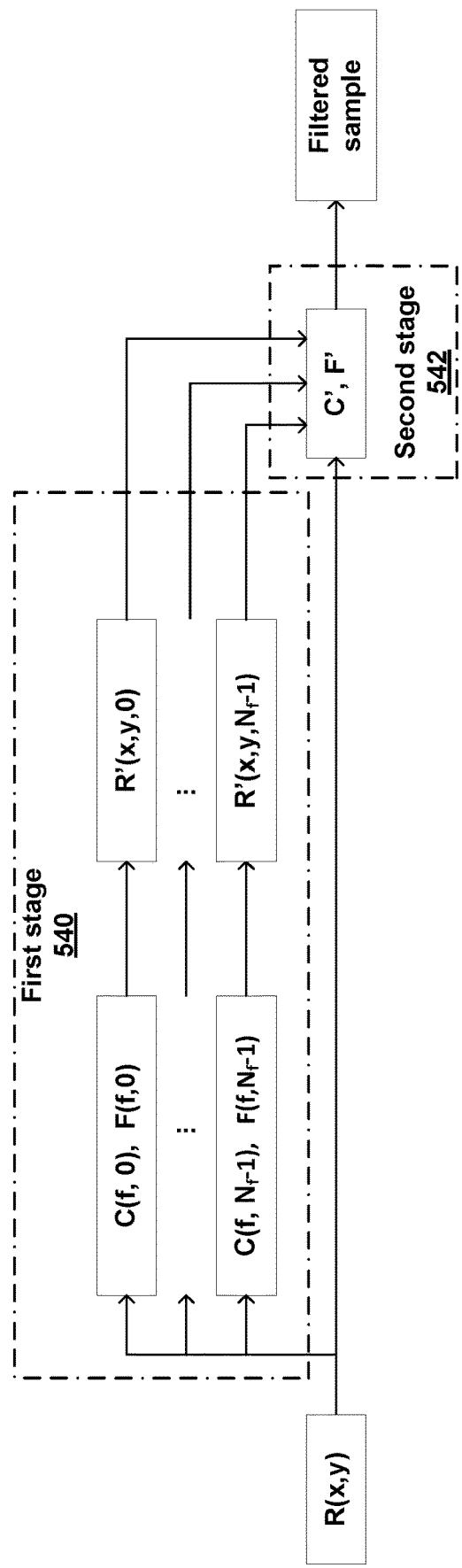
FIG. 11 shows an example for implementing multiple fixed filters with one signaled filter in accordance with the techniques of this disclosure.

FIG. 11 shows an example framework for implementing multiple fixed filters with one signaled filter in accordance with the techniques of this disclosure. In the example of FIG. 11, video encoder 200 and video decoder 300 apply first stage ALF 540 to reconstructed sample R(x,y) of a reconstructed block. To apply first stage ALF 540, video encoder 200 and video decoder 300 applies a classifier (C) to determine a first class index for the reconstructed sample and selects a filter (f) from a first set of filters (F) based on the first class index. Video encoder 200 and video decoder 300 applies the filter from the first set of filters to the reconstructed sample to determine a first intermediate sample value (R'). As shown in FIG. 11, in first stage 540, video encoder 200 and video decoder 300 may use multiple classifiers and multiple filters to determine multiple intermediate sample values.

Video encoder 200 and video decoder 300 apply second stage ALF 542 to the reconstructed sample. Equation (28) below shows an example of how video encoder 200 and video decoder 300 may apply the second stage ALF.

$N_f$ denotes numbers of fixed (pre-defined) filter sets, that may be applied to a sample. Rs are the input to ALF. F(f, i) with i=0 ... $N_f$−1 denotes the ith fixed filter set. C(f, i) with i=0 ... $N_f$−1 denotes the classifier with ith fixed filter set. Through C(f, i), for each sample, the filter index is calculated. Based on the filter index, a filter from the fixed filter set F(f, i) is chosen to filter that sample. In addition, C(f, i) determines how to apply the geometric transformation to the coefficients.

A first stage will now be described. In the first stage, for a reconstructed sample R(x, y), by using the reconstructed sample itself and neighboring samples, video encoder 200 and video decoder 300 may be configured to apply multiple fixed filter sets. Given a fixed filter set F(f, i), video encoder 200 and video decoder 300 may apply a classifier C(f, i). Based on the derived class index, video encoder 200 and video decoder 300 may apply a filter from the filter set F(f, i). In addition, geometry transformation is determined in C(f, i) and geometry transformation may be applied to the coefficients of the chosen filter. After the first stage, for each filter set and the corresponding classifier, video encoder 200 and video decoder 300 may calculate an intermediately filtered signal R', for example, as follows:

$$R'(x, y, i) = R(x, y) + \left[ \sum_{j=0}^{N_i-2} c_{i,j}(f_{i,j,0} + f_{i,j,1}) \right] \quad (19)$$

For ith filter, with i=0 ... $N_f$−1, $c_{i,j}$ is the jth coefficient of the filter picked from ith filter set F(f, i), $N_i$ is the number of coefficients and $f_{i,j,k}$ with k=0 or 1 is a function of one neighboring sample and current sample, for example, $f_{i,j,k}$ may be implemented as clipping function as in VVC $$f_{i,j,k} = \min(b_{i,j}, \max(-b_{i,j}, R(x+x_{i,j,k}, y+y_{i,j,k}) - R(x,y))) \quad (20)$$

$(x_{i,j,k}, y_{i,j,k})$ is the coordinate offset of a neighboring sample, relative to the current sample, $b_{i,j}$ is the jth clipping parameter of the filter chosen from ith filter set.

In some examples, the filter shapes of a fixed filter or a signaled filter may be 5×5, 7×7, 9×9, 11×11 and 13×13 as shown in FIG. 9.

In one example, video encoder 200 and video decoder 300 may determine in a classifier C(f, i), activity and direction values based on 2-D Laplacian values. The classifier may be applied to each sample or a block. When a classifier is applied to a block, all samples in the block have the same class index and the same transpose type. For example, $w_i$ can denote the width of a block, $h_i$ can denote height of the block and (x, y) can denote the coordinates of the top-left sample of the block.

For a sample with coordinates (k, l), video encoder 200 and video decoder 300 may be configured to derive four Laplacian (gradient) values: horizontal gradient H, vertical gradient V, 135-degree gradient D1 and 45-degree gradient D2, as follows:

$H_{k,l} = |2R(k,l) - R(k-1,l) - R(k+1,l)|$ $V_{k,l} = |2R(k,l) - R(k,l-1) - R(k,l+1)|$ $D1_{k,l} = |2R(k,l) - R(k-1,l-1) - R(k+1,l+1)|$ $D2_{k,l} = |2R(k,l) - R(k-1,l+1) - R(k+1,l-1)| \quad (21)$ Video encoder 200 and video decoder 300 may derive the activity value $A_i$ by using vertical and horizontal gradients as follows:

$$A_i = \left( \sum_{k=x-a_i}^{x+w_i+a_i-1} \sum_{l=y-b_i}^{y+h_i+b_i-1} (V_{k,l} + H_{k,l}) \right) \quad (22)$$

where $a_i$ and $b_i$ are the window sizes in horizontal and vertical directions for classifier C(f, i), respectively.

Video encoder 200 and video decoder 300 may be configured to quantize $A_i$ to the range of 0 to $M_{A,i}$−1 inclusive, and the quantized value is denoted as $Â_1$.

In one example, $M_{A,i} = 16$, $A_i = \min(192, (mult_i \cdot A_i) >> (9 + bitdepth))$ and $Â_i = Q[A_i]$, where

Q[193] = {0, 1, 2, 3, 4, 4, 5, 5, 6, 6, 6, 6, 7, 7, 7, 7, 8, 8, 8, 8, 8, 8, 8, 8, 9, 9, 9, 9, 9, 9, 9, 9, 10, 10, 10, 10, 10, 10, 10, 10, 10, 10, 10, 10, 10, 10, 10, 10, 11, 11, 11, 11, 11, 11, 11, 11, 11, 11, 11, 11, 11, 11, 11, 12, 12, 12, 12, 12, 12, 12, 12, 12, 12, 12, 12, 12, 12, 12, 12, 12, 12, 12, 12, 12, 12, 12, 12, 12, 12, 12, 12, 12, 13, 13, 13, 13, 13, 13, 13, 13, 13, 13, 13,

-continued 13, 13, 13, 13, 13, 13, 13, 13, 13, 13, 13, 13, 13, 13, 13, 13, 13, 13, 13, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 15};

bitdepth is the bit depth of R(x, y), $mult_i$ may be dependent on the window size $(a_i, b_i)$ and $mult_i$ may be equal to the following values:

| $a_i$ | $b_i$ | $mult_i$ |
|---|---|---|
| 0 | 0 | 5628 |
| 1 | 1 | 1407 |
| 2 | 2 | 624 |
| 3 | 3 | 351 |
| 4 | 4 | 225 |
| 5 | 5 | 156 |

Video encoder 200 and video decoder 300 may be configured to determine a direction by using horizontal gradient H, vertical gradient V, 135-degree gradient D1 and 45-degree gradient D2.

Video encoder 200 and video decoder 300 may be configured to first calculate values of horizontal gradient $g_{i,H}$, vertical gradient $g_{i,V}$, and two diagonal gradients, $g_{i,D1}$ and $g_{i,D2}$, as follows:

$$g_{i,H} = \sum_{k=x-a_i}^{x+w_i+a_i-1} \sum_{l=y-b_i}^{y+h_i+b_i-1} H_{k,l}, \; g_{i,V} = \sum_{k=x-a_i}^{x+w_i+a_i-1} \sum_{l=y-b_i}^{y+h_i+b_i-1} V_{k,l},$$

$$g_{i,D1} = \sum_{k=x-a_i}^{x+w_i+a_i-1} \sum_{l=y-b_i}^{y+h_i+b_i-1} D1_{k,l}, \; g_{i,D2} = \sum_{k=x-a_i}^{x+w_i+a_i-1} \sum_{l=y-b_i}^{y+h_i+b_i-1} D2_{k,l},$$
(23)

To assign the directionality $D_i$, video encoder 200 and video decoder 300 may be configured to derive the maximum and minimum of the horizontal and vertical gradients and the maximum and minimum of the two diagonal gradients as follows:

$$g_{i,h,v}^{max} = \max(g_{i,H}, g_{i,V}), g_{i,h,v}^{min} = \min(g_{i,H}, g_{i,V}) \quad (24)$$

$$g_{i,D1,D2}^{max} = \max(g_{i,D1}, g_{i,D2}), g_{i,D1,D2}^{min} = \min(g_{i,D1}, g_{i,D2}) \quad (25)$$

Then video encoder 200 and video decoder 300 may be configured to derive direction $D_i$, with number of directions $M_{D,i}=5$, as follows:

Step 1. If both $g_{i,h,v}^{max} \le t_1 \cdot g_{i,h,v}^{min}$ and $g_{i,D1,D2}^{max} \le t_1 \cdot g_{i,D1,D2}^{min}$, $D_i$ is set to 0 (block is categorized as "texture").
Step 2. If $g_{i,h,v}^{max}/g_{i,h,v}^{min} > g_{i,D1,D2}^{max}/g_{i,D1,D2}^{min}$, continue from Step 3, otherwise continue from Step 4.
Step 3. If $g_{i,h,v}^{max} > t_2 \cdot g_{i,h,v}^{min}$, $D_i$ is set to 2 (block is categorized as "strong horizontal/vertical"), otherwise $D_i$ is set to 1 (block is categorized as "weak horizontal/vertical").
Step 4. If $g_{i,D1,D2}^{max} > t_2 \cdot g_{i,D1,D2}^{min}$, $D_i$ is set to 4 (block is categorized as "strong diagonal"), otherwise $D_i$ is set to 3. (block is categorized as "weak diagonal").

In some examples, more directions may be supported.

Video encoder 200 and video decoder 300 may be configured to calculate edge strengths of horizontal/vertical directions ($ES_{i,HV}$) by comparing the ratio $g_{i,h,v}^{max}/g_{i,h,v}^{min}$ to an array of thresholds (Th). The size of the array of thresholds can be S, and the thresholds can be sorted ascendingly. The number of directions is $M_{D,i}=(S+1)*(S+2)$ Step 1. Initialize m=0 and $ES_{i,HV}=0$;
Step 2. If m is equal to S, stop; otherwise, go to Step 3.
Step 3. if $g_{i,h,v}^{max}/g_{i,h,v}^{min} > Th[m]$, m=m+1 and $ES_{i,HV}=ES_{i,HV}+1$, go to Step 2; otherwise, stop.

Video encoder 200 and video decoder 300 may be configured to calculate a diagonal direction directions ($E_{i,D}$) as follows:

Step 1. Initialize m=0 and $E_{i,D}=0$;
Step 2. If m is equal to S, stop; otherwise, go to Step 3.
Step 3. if $g_{i,D1,D2}^{max}/g_{i,D1,D2}^{min} > Th[m]$, m=m+1 and $E_{i,D}=E_{i,D}+1$, go to Step 2; otherwise, stop.

An example of the array of thresholds is Th=[1.25, 1.5, 2, 3, 4.5, 8] and S=6.

Video encoder 200 and video decoder 300 may be configured to determine a major edge strength ($ES_M$) and a secondary edge strength ($ES_S$) as follows:

If $g_{i,h,v}^{max}/g_{i,h,v}^{min} > g_{i,D1,D2}^{max}/g_{i,D1,D2}^{min}$, $ES_M$ is set as $ES_{HV}$ and $ES_S$ is set as $ES_D$; otherwise, $ES_M$ is set as $ES_D$ and $ES_S$ is set as $ES_{HV}$ If $ES_S$ is larger than $ES_M$, $D_i$ is set to 0. Otherwise, if $g_{i,h,v}^{max}/g_{i,h,v}^{min} > g_{i,D1,D2}^{max}/g_{i,D1,D2}^{min}$, $D_i = ES_M*(ES_M+1)/2+ES_S$; else, $D_i = ES_M*(ES_M+1)/2+ES_S+M_{D,i}/2$ Class index $C_i$ may be derived as $C_i = A_i * M_{D,i} + D_i$ Based on $C_i$, a filter from C(f, i) is picked.

Video encoder 200 and video decoder 300 may select a fixed filter set F(f, i) and the corresponding classifier C(f, i) from one or more candidate fixed filter sets. In one example, given an i, there may be some candidate fixed filter sets for fixed filter set F(f, i) and classifier C(f, i). And the fixed filter set F(f, i) and classifier C(f, i) may be chosen based on coding information, such as picture/CTU/CU/PU/TU size, QP, number of non-zero quantized coefficients, motion vectors, window size ($a_i$, $b_i$) and so on. In some examples, for each F(f, i), a syntax element may be signaled to indicate which fixed filter set is used out of the candidate fixed filter set for ith fixed filter set. The syntax element may be signaled at SPS, PPS, VPS, APS, PH, SH, sub-picture, CTU or block level. In some examples, all these syntax elements may have the same value and only one syntax element is needed to be signaled. In some examples, a candidate fixed filter set may only have one fixed filter set, so no syntax element is needed to be signaled.

In one example, given a window size ($a_i, b_i$), the number of all available fixed filter is T. For example, QP can denote the quantization parameter of a current sample, with QP_MIN, QP_MAX, and QP_OFFSET being pre-defined values. The indices of two candidate fixed filter sets may be determined as $I_0$=min(T−2,max(0,(qp−QP_MIN)/QP_OFFSET),
$I_1=I_0+1$.

A syntax element may be signaled to indicate whether $I_0$th candidate fixed filter set or $I_1$th candidate fixed filter set is used for an F(f, i). In some examples, all fixed filter sets may share the same syntax element.

Aspects of a second Stage will now be described. In the second stage, F' is a signaled filter or a predefined filter set and C' is the corresponding classifier. The intermediate filtered results may be further filtered with current sample and/or its neighbors. C' may be used to determine which filter in F' is applied and how to transpose the coefficients. C' may use the Rs and/or R's to determine the filter index for filter set F' by calculating activity and directions as the first stage. Transpose may be applied when applying F'.

In one example, for a sample with coordinates (k, l), four Laplacian (gradient) values: horizontal gradient H, vertical gradient V, 135-degree gradient D1 and 45-degree gradient D2 may derived as $$H_{k,l} = |2R(k,l) - R(k-1,l) - R(k+1,l)|$$

$$V_{k,l} = |2R(k,l) - R(k,l-1) - R(k,l+1)|$$

$$D1_{k,l} = |2R(k,l) - R(k-1,l-1) - R(k+1,l+1)|$$

$$D2_{k,l} = |2R(k,l) - R(k-1,l+1) - R(k+1,l-1)| \quad (26)$$

Video encoder 200 and video decoder 300 may be configured to derive the activity value A by using vertical and horizontal gradients as follows:

$$A = \left( \sum_{k=x-a}^{x+w+a-1} \sum_{l=y-b}^{y+h+b-1} (V_{k,l} + H_{k,l}) \right) \quad (27)$$

where a and b are the window sizes in horizontal and vertical directions for classifier C' respectively and w and h are the width and height of a block where all samples have the same classification index and the same transpose index.

Video encoder 200 and video decoder 300 may be configured to quantize A o the range of 0 to $M_A-1$ inclusive, and the quantized value is denoted as Â. For example, $$A = \min(15, (\text{mult} \cdot A) >> (9+\text{bitdepth})) \text{ and } \hat{A} = Q[A],$$
where
$$Q = \{0, 1, 2, 2, 2, 2, 2, 3, 3, 3, 3, 3, 3, 3, 3, 4\}$$

bitdepth is the bit depth of R(x, y), mult may be dependent on the window size a*b and mult may be equal to the following values:

| a | b | mult |
|---|---|------|
| 0 | 0 | 5628 |
| 1 | 1 | 1407 |
| 2 | 2 | 624  |
| 3 | 3 | 351  |
| 4 | 4 | 225  |
| 5 | 5 | 156  |

Direction and how to perform transpose may be calculated in the manner described in U.S. Patent Publication 2017/0238020A1, U.S. Patent Publication 2017/0237981A1, or U.S. Patent Publication 2017/0237982A1, all of which are incorporated herein by reference.

Further Aspects of filtering will now be described. After getting the class index of a sample from C', video encoder 200 and video decoder 300 may be configured to select a filter from the filter set F' based on the class index. Video encoder 200 and video decoder 300 may be configured to apply the filter as:

$$\tilde{R}(x, y) = R(x, y) + \left[ \sum_{i=0}^{N_0-2} c_i(f_{i,0} + f_{i,1}) \right] + \left[ \sum_{i=N_0}^{N_0+N_1-1} c_i g_i \right] \quad (28)$$

In (28), the filtering is separated into 2 parts:
Filter part 1: $[\Sigma_{i=0}^{N_0-2} c_i (f_{i,0}+f_{i,1})]$: filtering by using neighbouring samples, geometric transformation may be applied. $N_0$ is the number of coefficients of the applied filter shape. The filter may be 5×5, 7×7, 9×9, 11×11 or 13×13 diamond filter as shown in FIG. 9.

Filter part 2: $[\Sigma_{i=N_0}^{N_0+N_1-1} c_i g_i]$: filtering by using intermediately filtered samples, geometric transformation may be applied. $N_0$ and $N_1$ represent the number of potentially unique coefficients.

The function $f_{i,j}$ with j=0 or 1 may be defined with clipping functions as $$f_{i,j} = f_{i,j}(R(x + x_{i,j}, y + y_{i,j}), R(x, y)) = \quad (29)$$
$$\min(b_i, \max(-b_i, R(x + x_{i,j}, y + y_{i,j}) - R(x, y)))$$

The function $g_i$ may be defined with clipping functions as $$g_i = g_i(R'(x, y, i - N_0), R(x, y)) = \quad (30)$$
$$\min(b_i, \max(-b_i, R'(x, y, i - N_0) - R(x, y)))$$

$b_i$ is the clipping parameter corresponding to coefficient $c_i$.

Figures 12A, 12B, 12C:
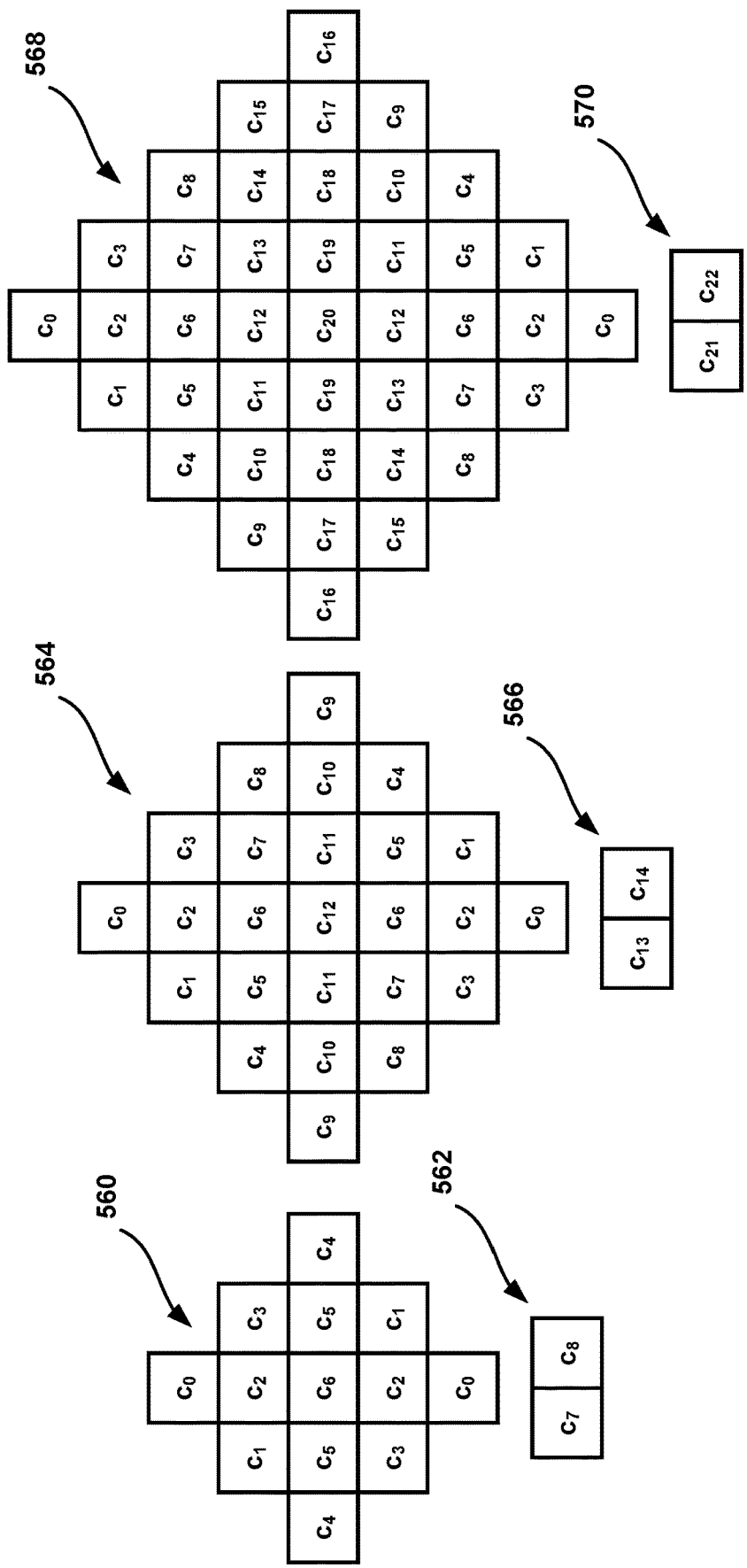
FIGS. 12A-12E show examples of two-part filters that may be used in accordance with the techniques of this disclosure.
Figure 12E:
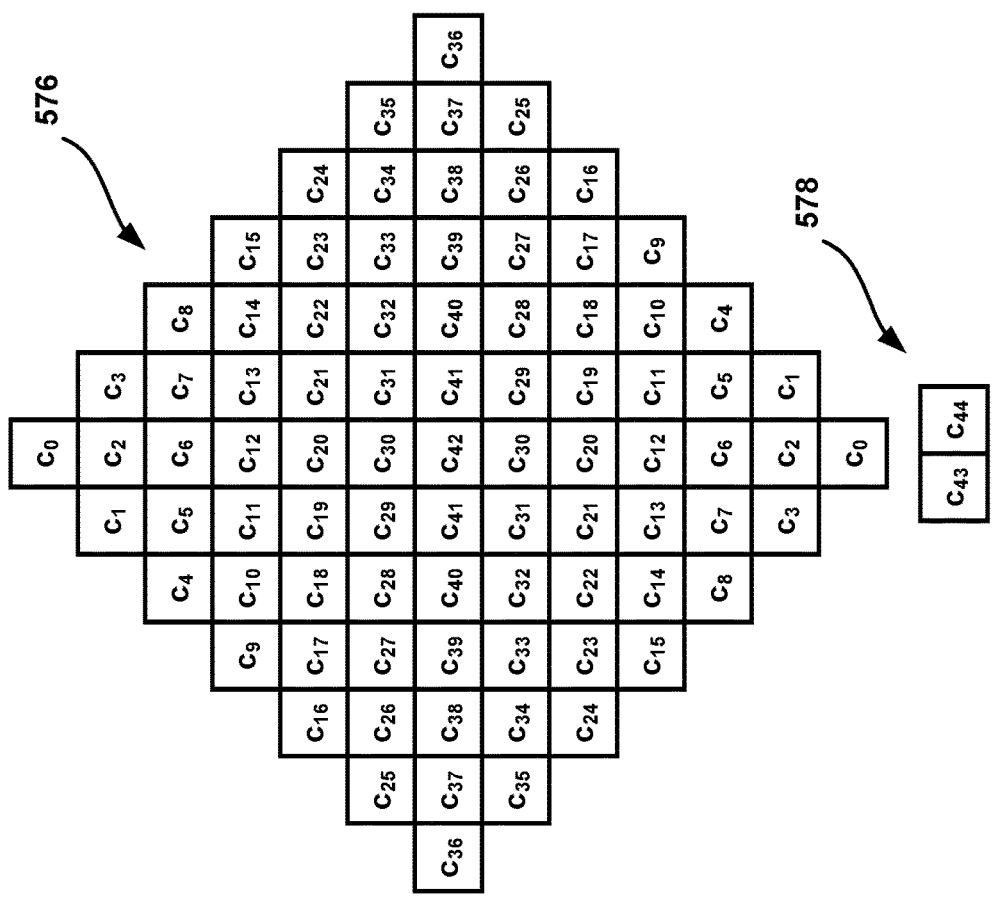
Figure 12D:
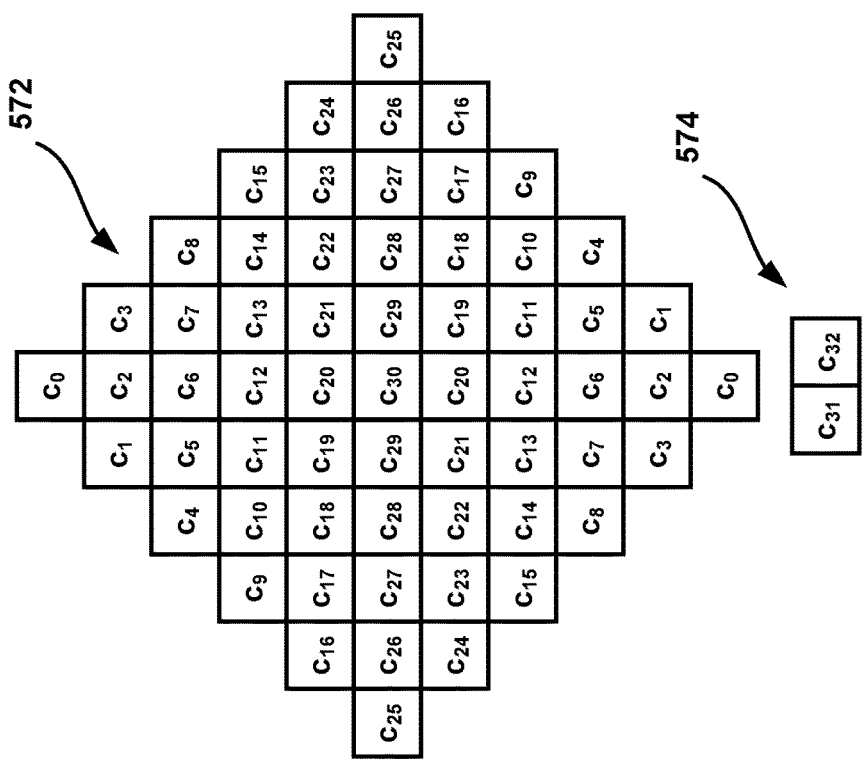

FIGS. 12A-12E show examples of two-part filters. FIG. 12A shows an example, where filter part 1 (filter 560) is 5×5 $N_1=7$ and for filter part 2 (filter 562) $N_1=2$. FIG. 12B shows an example, where filter part 1 (filter 564) is 7×7 $N_0=13$ and for filter part 2 (filter 566) $N_1=2$. FIG. 12C shows an example, where filter part 1 (filter 568) is 9×9 $N_1=21$ and for filter part 2 (filter 570) $N_1=2$. FIG. 12D shows an example, where filter part 1 (filter 572) is 11×11 $N_1=31$ and for filter part 2 (filter 574) $N_1=2$. FIG. 12E shows an example, where filter part 1 (filter 576) is 13×13 $N_1=43$ and for filter part 2 (filter 578) $N_1=2$.

In some examples, the values of $N_0$ and/or $N_1$ may be signaled explicitly or determined implicitly at SPS, VPS, PPS, APS, PH, SH, sub-picture header or block level.

In some examples, a flag may be signaled explicitly or determined implicitly at SPS, VPS, PPS, APS, PH, SH, sub-picture header, block level or filter level, such that when this flag is equal to one value, all coefficients $c_i=$, i=0 . . . $N_0-1$ and clipping parameters $b_i=$, i=0 . . . $N_0-1$ are not signaled/used and inferred to be 0.

In some examples, a flag may be signaled explicitly or determined implicitly at the SPS, VPS, PPS, APS, PH, SH, sub-picture header, block level or filter level, such that when this flag is equal to one value, all coefficients $c_i=$, i=$N_0$ . . . $N_0+N_1-1$ and clipping parameters $b_i=$, i=$N_0$ . . . $N_0+N_1-1$ are not signaled/used and inferred to be 0.

In one filter set, the values of $N_0$ may be different from filter to filter. In one filter set, the values of $N_1$ may be different from filter to filter.

This disclosure recognizes that ALF performance may be improved on top of JVET-U0100 and the techniques described in U.S. Provisional Patent Application No. 63/130,275. When only the filtered samples from the first stage are preferred and the filtering in the second stage is not needed, the filter coefficients $c_i$ with i=0 . . . $N_0-2$ of F' are still signaled, which are all zeros. However, it is not necessary to signal all these zero coefficients. Thus, an alternative signaling process could be applied to improve coding efficiency.

In some examples, video encoder 200 and video decoder 300 may be configured to code data representative of one or more filters F(f, i) in the bitstream, rather than only using fixed filters. Additionally or alternatively, video encoder 200 and video decoder 300 may be configured to determine whether to perform the second stage of filtering as discussed above. When the second stage is not performed, video encoder 200 and video decoder 300 may avoid coding (encoding and/or decoding) coefficients for one or more filters applied during the second stage, which may reduce signaling overhead in the bitstream as well as processing performed by both video encoder 200 and video decoder 300.

Figure 13:
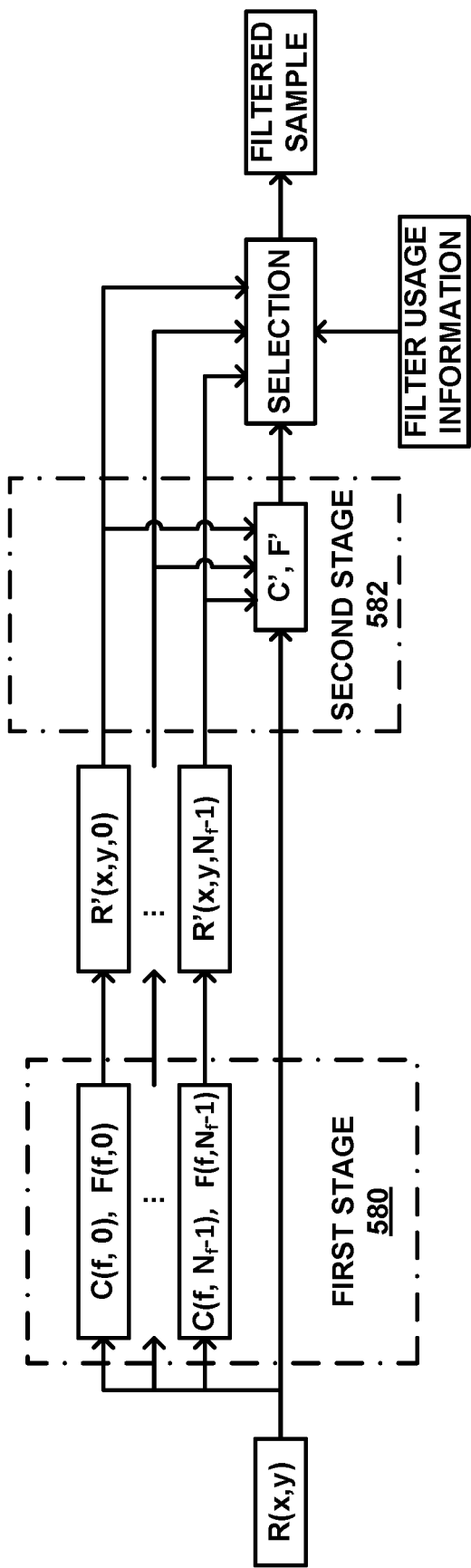
FIGS. 13 and 14 are a conceptual diagrams illustrating example ALF frameworks according to the techniques of this disclosure.

FIG. 13 is a conceptual diagram illustrating an example ALF framework according to the techniques of this disclosure. Video decoder 300 may be configured to perform the techniques described with respect to FIG. 13. As shown in FIG. 13, the example ALF framework includes both first stage 580 and second stage 582. According to the techniques of this disclosure, video encoder 200 and video decoder 300 may use filter usage information to determine whether the second stage is to be performed. When the second stage is not to be performed, video encoder 200 and video decoder 300 may bypass the filtering (C', F') in the second stage, as shown in FIG. 13. Thus, video encoder 200 and video decoder 300 may use only the intermediate filtered samples (R'(x, y, 0) . . . R'(x,y,$N_f$−1)) from the first stage to calculate filtered samples.

Further, video decoder 300 may calculate a weighted sum of intermediate filtered samples from various filters, e.g., according to:

$$\tilde{R}(x,y)=\Sigma_{i=0}^{N_f-1} w_i R'(x,y,i) \quad (21)$$

where $w_i$ is the weight of R'(x, y, i).

In some examples, the filter usage information may be signaled at the sequence, picture, slice, sub-picture, CTU, CTB, or sub-block level. For example, video encoder 200 and video decoder 300 may code the filter usage information in one or more of a sequence parameter set (SPS), a picture parameter set (PPS), a slice header, a sub-picture header, a coding tree unit (CTU) header, a coding tree block (CTB) header, or a sub-block header.

In another example, the filter usage information may not be signaled. Instead, video decoder 300 may adaptively derive the filter usage information based on coding information, such as quantization parameter (QP), block size, inter/intra modes, or other such data.

The weights $w_i$ with i=0 . . . $N_f$−1 may be fixed given a value of filter usage information, or video encoder 200 and video decoder 300 may code values for weights $w_i$ in the bit stream at the sequence, picture, slice, sub-picture, CTU, CTB, sub-block level. Several combinations of weights $w_i$ may be used, the filter usage information may be used to determine which combination of weights $w_i$ is used for current sample.

In one example, a first flag may be signaled. When this first flag is equal to one, then video encoder 200 and video decoder 300 may bypass the value (C', F'). Then a second flag may be signaled. Video encoder 200 and video decoder 300 may associate the value of the second flag with the combination of weights $w_i$ with i=0 . . . $N_f$−1. For example, if the second flag is equal to i, i could be 0 . . . $N_f$−1, then R'(x, y, i) may be used as the filtered sample.

Figure 14:
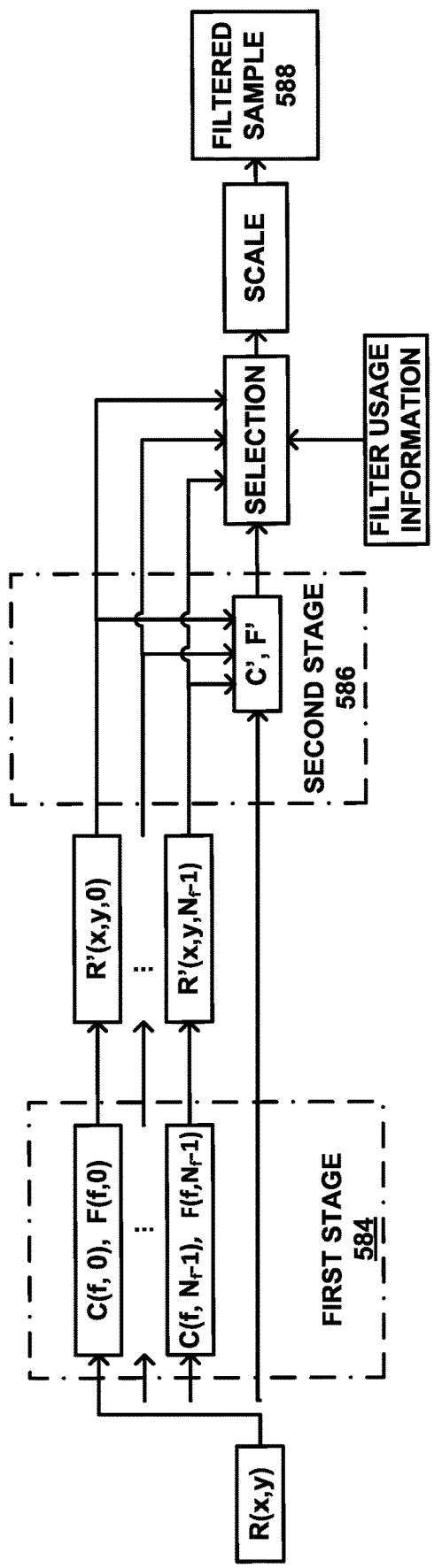

FIG. 14 is a conceptual diagram illustrating another example ALF framework according to the techniques of this disclosure. Video encoder 200 and video decoder 300 may be configured according to the techniques described with respect to FIG. 14. In particular, in FIG. 14, scaling is applied to the filtered results to get filtered samples.

FIG. 14 shows an example framework for using multiple fixed filter sets and multiple signaled filter sets to filter a reconstructed sample of video data. Video decoder 300 may be configured to implement multiple fixed filters and multiple signaled filters in accordance with the techniques of FIG. 14. In the example of FIG. 14, video decoder 300 applies first stage ALF 584 to reconstructed sample R(x,y) to determine intermediate filtered signal R'. Video decoder 300 then applies second ALF stage 586 to R' to determine a value for filtered sample 588.

Figure 15:
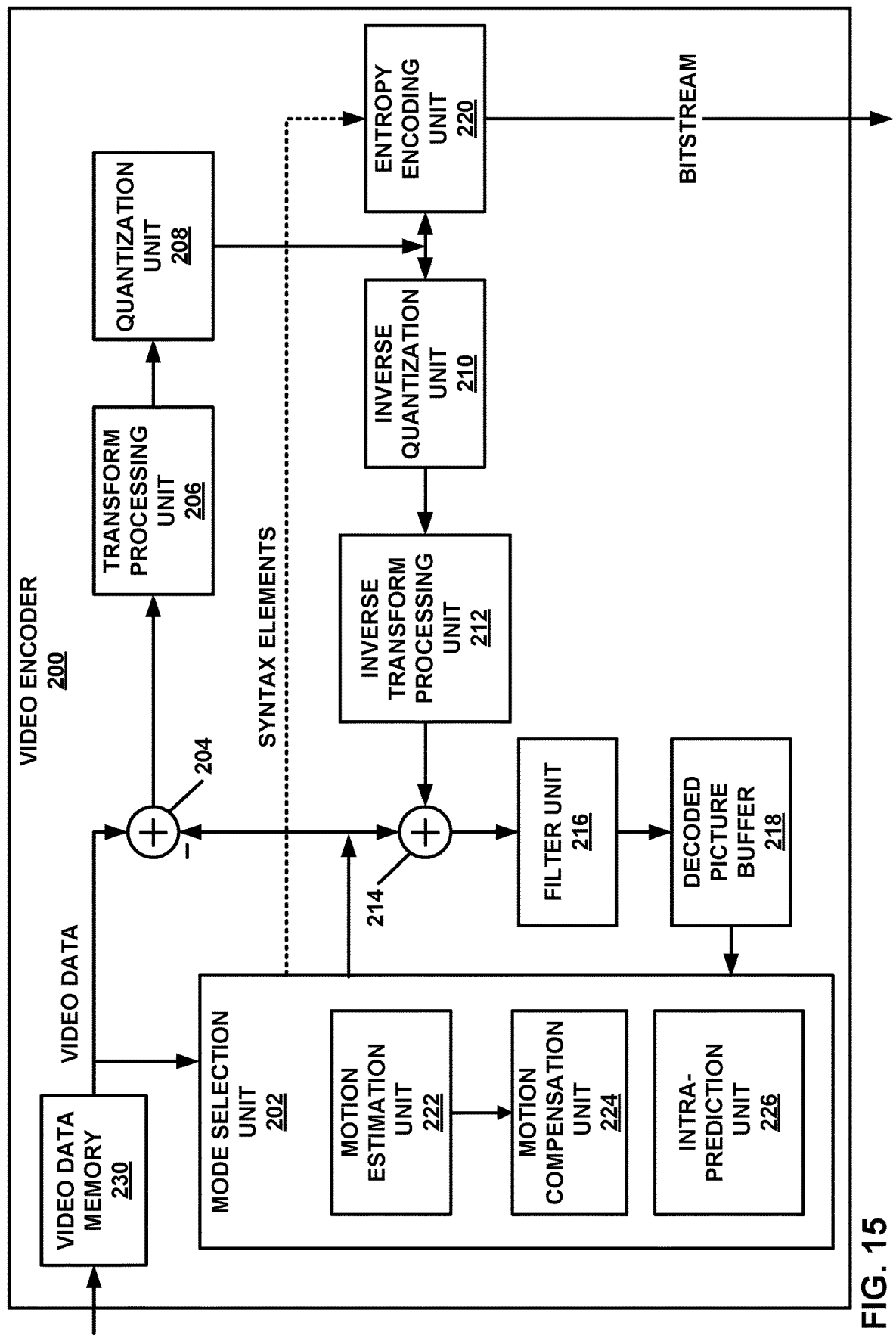
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof.

Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 16:
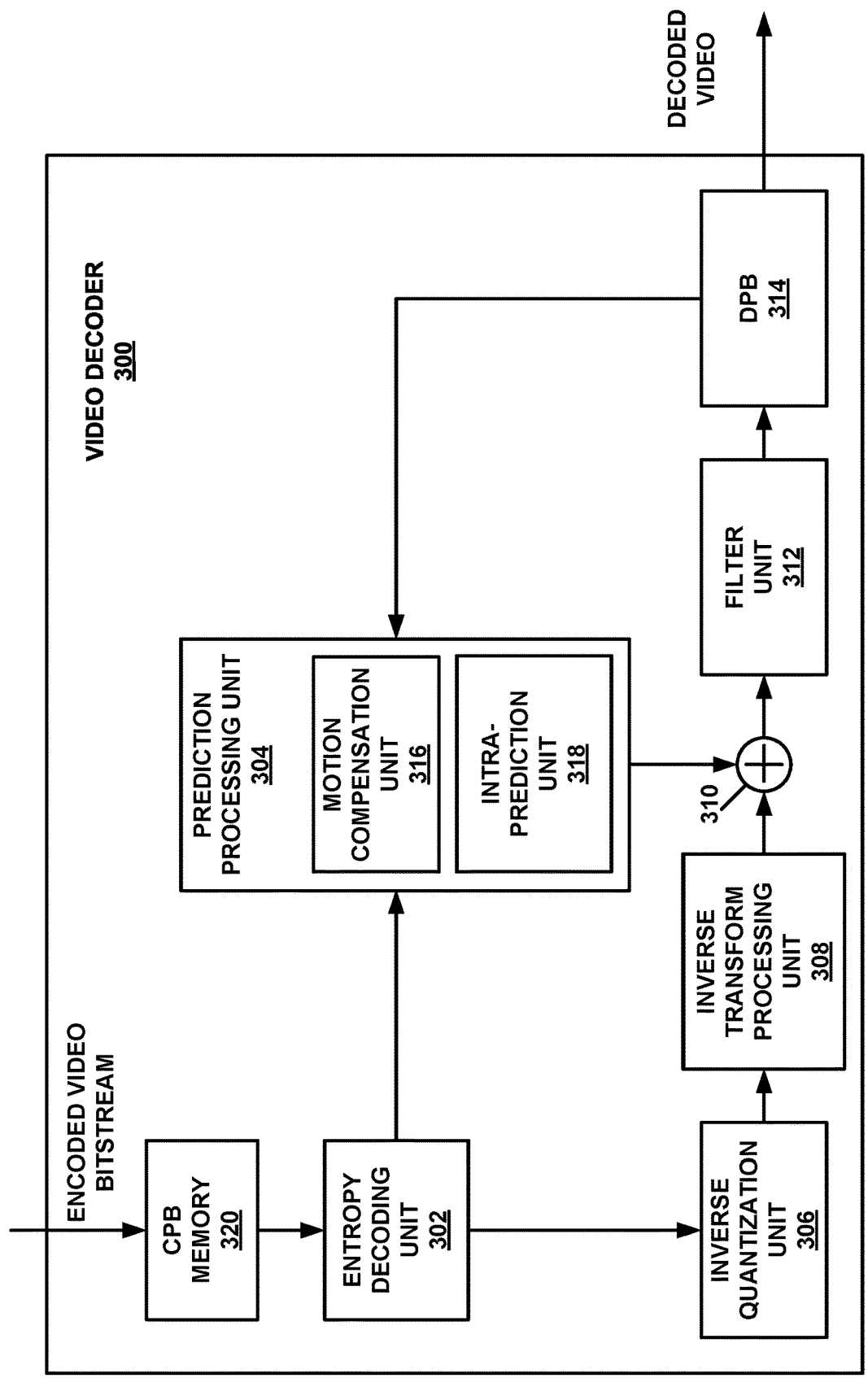
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 17:
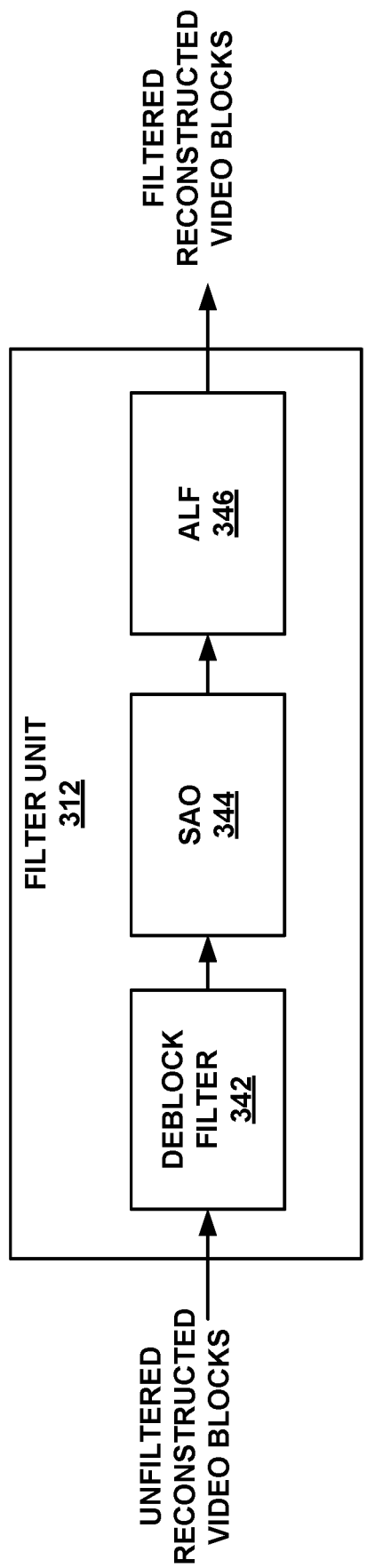
FIG. 17 is a block diagram illustrating an example filter unit for performing the techniques of this disclosure.

FIG. 17 shows an example implementation of filter unit 312 in FIG. 16. Filter unit 216 in FIG. 15 may be implemented in the same manner. Filter units 216 and 312 may perform the techniques of this disclosure, possibly in conjunction with other components of video encoder 200 or video decoder 300. In the example of FIG. 16, filter unit 312 includes deblock filter 342, SAO filter 344, and ALF unit 346. SAO filter 344 may, for example, be configured to determine offset values for samples of a block in the manner described in this disclosure. ALF unit 346 may likewise filter blocks of video data in the manner described in this disclosure. For example, ALF unit 346 may be configured to apply a first stage ALF to a reconstructed sample of a reconstructed block to determine a first sample modification value, apply a second stage ALF to the reconstructed sample to determine a second sample modification value, and determine a filtered reconstructed sample based on the reconstructed sample, the first sample modification value, and the second sample modification value.

Filter unit 312 may include fewer filters and/or may include additional filters. Additionally, the particular filters shown in FIG. 17 may be implemented in a different order. Other loop filters (either in the coding loop or after the coding loop) may also be used to smooth pixel transitions or otherwise improve the video quality. The filtered reconstructed video blocks output by filter unit 312 may be stored in DPB 314, which stores reference pictures used for subsequent motion compensation. DPB 314 may be part of or separate from additional memory that stores decoded video for later presentation on a display device, such as display device 118 of FIG. 1.

Figure 18:
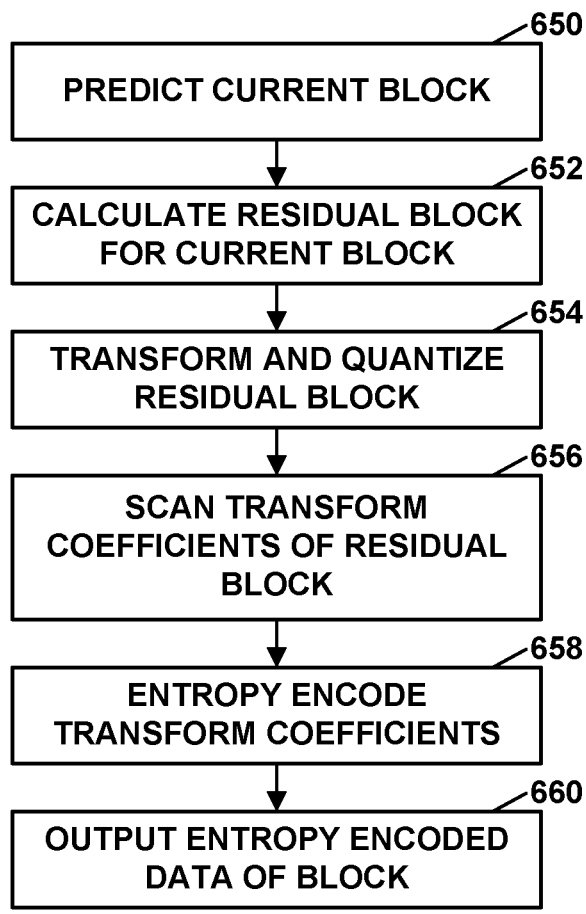
FIG. 18 is a flowchart illustrating an example process for encoding a current block in accordance with the techniques of this disclosure.

FIG. 18 is a flowchart illustrating an example process for encoding a current block in accordance with the techniques of this disclosure. The current block may comprise a current CU. Although described with respect to video encoder 200 (FIGS. 1 and 14), it should be understood that other devices may be configured to perform a process similar to that of FIG. 18.

In this example, video encoder 200 initially predicts the current block (650). For example, video encoder 200 may form a prediction block for the current block. Video encoder 200 may then calculate a residual block for the current block (652). To calculate the residual block, video encoder 200 may calculate a difference between the original, unencoded block and the prediction block for the current block. Video encoder 200 may then transform the residual block and quantize transform coefficients of the residual block (654). Next, video encoder 200 may scan the quantized transform coefficients of the residual block (656). During the scan, or following the scan, video encoder 200 may entropy encode the transform coefficients (658). For example, video encoder 200 may encode the transform coefficients using CAVLC or CABAC. Video encoder 200 may then output the entropy encoded data of the block (660).

Figure 19:
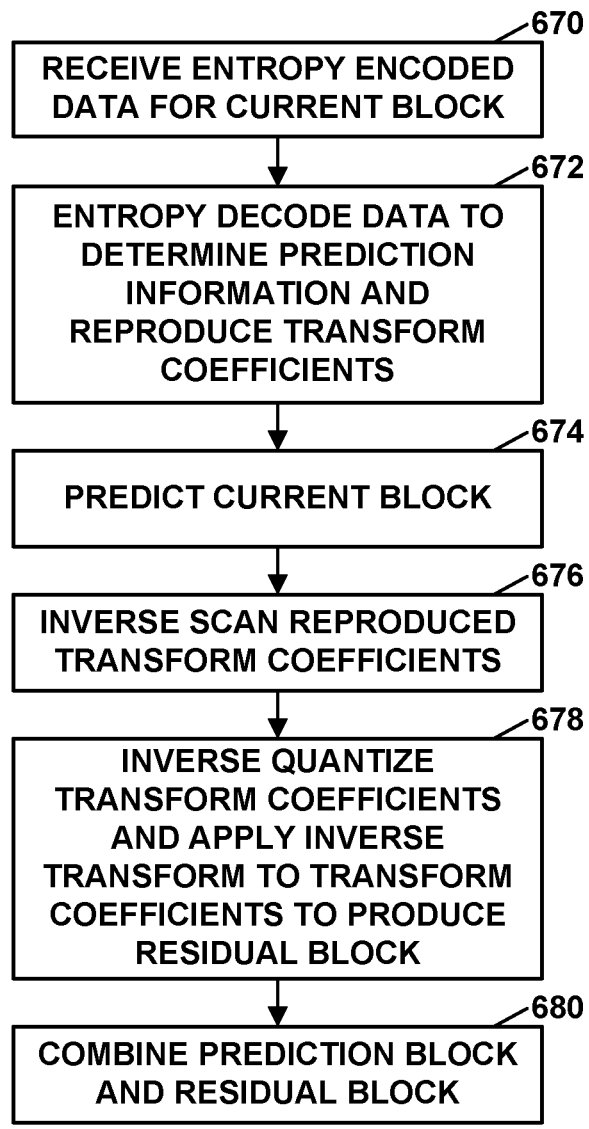
FIG. 19 is a flowchart illustrating an example process for decoding a current block in accordance with the techniques of this disclosure.

FIG. 19 is a flowchart illustrating an example process for decoding a current block of video data in accordance with the techniques of this disclosure. The current block may comprise a current CU. Although described with respect to video decoder 300 (FIGS. 1 and 15), it should be understood that other devices may be configured to perform a process similar to that of FIG. 19.

Video decoder 300 may receive entropy encoded data for the current block, such as entropy encoded prediction information and entropy encoded data for transform coefficients of a residual block corresponding to the current block (670). Video decoder 300 may entropy decode the entropy encoded data to determine prediction information for the current block and to reproduce transform coefficients of the residual block (672). Video decoder 300 may predict the current block (674), e.g., using an intra- or inter-prediction mode as indicated by the prediction information for the current block, to calculate a prediction block for the current block. Video decoder 300 may then inverse scan the reproduced transform coefficients (676), to create a block of quantized transform coefficients. Video decoder 300 may then inverse quantize the transform coefficients and apply an inverse transform to the transform coefficients to produce a residual block (678). Video decoder 300 may ultimately decode the current block by combining the prediction block and the residual block (680).

Figure 20:
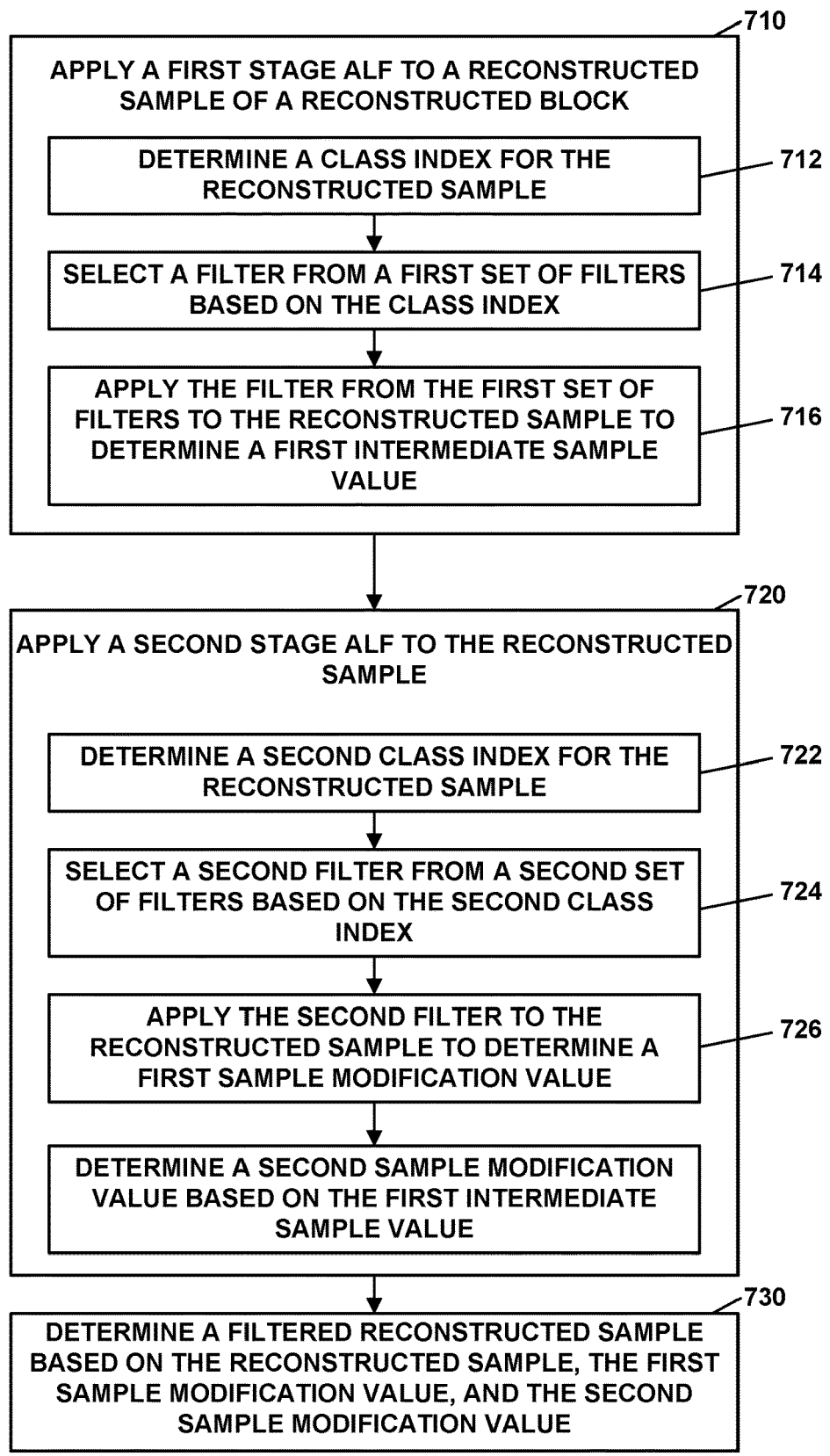
FIG. 20 is a flowchart illustrating an example process for decoding a current block in accordance with the techniques of this disclosure.

FIG. 20 is a flowchart illustrating an example process for decoding a current block of video data in accordance with the techniques of this disclosure. Although described with respect to video decoder 300 (FIGS. 1 and 15), it should be understood that other devices may be configured to perform a process similar to that of FIG. 20. For example, the video decoding loop of video encoder 200, including filter unit 216, may perform the techniques of FIG. 20.

Video decoder 300 applies a first stage ALF to a reconstructed sample of a reconstructed block, wherein applying the first stage ALF comprises (710). In this context, the reconstructed sample may be either a reconstructed sample before deblock filtering or after deblock filtering. To apply the first stage ALF, video decoder 300 determines a first class index for the reconstructed sample (712), selects a filter from a first set of filters based on the first class index (714), and applies the filter from the first set of filters to the reconstructed sample to determine a first intermediate sample value (716). As described above, video decoder 300 may select the first set of filters from a plurality of sets of fixed filters based on a quantization parameter for the reconstructed block. The first set of filters may, for example, be fixed filters. That is, the first set of filters may be a set of filters that are stored in a video codec as opposed to being signaled in the video data. The first set of filters may, for example, include at least one 9×9 diamond-shaped filter or filters of any size or shape described above. As illustrated by FIGS. 9 and 11, video decoder may determine multiple intermediate sample values.

To determine the first class index, video decoder 300 may determine an activity value for the reconstructed sample, determine a direction for the reconstructed sample, and determine the classifier based on the activity value and the direction. As described above, the number of directions may be $M_{D,i}=(S+1)*(S+2)$, which with S equal to 6 means there are 56 directions.

Video decoder 300 applies a second stage ALF to the reconstructed sample (720). To apply the second stage ALF, video decoder 300 determines a second class index for the reconstructed sample (722), selects a second filter from a second set of filters based on the second class index (724), applies the second filter to the reconstructed sample to determine a first sample modification value (726), and determines a second sample modification value based on the first intermediate sample value. The second set of filters may, for example, be signaled filters, meaning the filters in the second set are at least partially signaled in the video data.

Video decoder 300 determines a filtered reconstructed sample based on the reconstructed sample, the first sample modification value, and the second sample modification value (730). To determine the filtered reconstructed sample based on the reconstructed sample, the first sample modification value, and the second sample modification value, video decoder 300 may, for example, add the first sample modification value and the second sample modification value to the reconstructed sample. Equation (28) above represents one example of how video decoder 300 may determine a value for the filtered reconstructed sample.

To determine the second sample modification value based on the first intermediate sample value, video decoder 300 may clip the second sample modification value to determine a clipped sample modification value and add the first sample modification value and the clipped sample modification value to the reconstructed sample. Video decoder 300 may receive, in the video data, the clipped sample modification value. To determine the second sample modification value based on the first intermediate sample value, video decoder 300 may also determine the second sample modification value based on the first intermediate sample value by determining a difference between the reconstructed sample and the first intermediate sample value. Equations (28) and (30) above represent an example of how video decoder 300 may determine the second sample modification value.

Video decoder 300 may output a decoded picture of the video data that includes the filtered reconstructed sample. In some coding scenarios, video decoder 300 may perform one or more additional filtering operations on the filtered reconstructed sample prior to outputting. Video decoder 300 may output the decoded picture by storing the picture in a decoded picture buffer for use in decoding subsequent pictures, storing the decoded picture to a storage medium for later display, or by outputting the decoded picture to a display device for real-time or near real-time display. In instances where the techniques of FIG. 20 are performed by a video encoder, the video encoder may, for example, output the decoded picture by storing the picture in a decoded picture buffer for use in encoding subsequent pictures.

The following numbered clauses illustrate one or more aspects of the devices and techniques described in this disclosure.

Clause 1A. A method of decoding video data, the method comprising: determining a reconstructed block of video data; and applying a filter to a sample of the reconstructed block of video data to generate a filtered reconstructed block.

Clause 2A. The method of clause 1A, wherein applying the filter to the sample comprises: determining one or both of an activity value for the sample and a direction for the sample; and selecting the filter from a set of filters based on the determined activity value and/or the direction.

Clause 3A. The method of clause 2A, wherein the set of filters comprises a set of fixed filters.

Clause 4A. The method of clause 2A, wherein the set of filters comprises a set of signaled filters.

Clause 5A. The method of any of clauses 1A-4A, wherein applying the filter to the sample comprises: applying a first filter to the sample to determine an intermediate filtered sample; and applying a second filter to the intermediate filtered sample to determine a final filter sampled.

Clause 6A. The method of any of clauses 1A-5A, wherein the method of decoding is performed as part of a video encoding process.

Clause 7A. A device for coding video data, the device comprising one or more means for performing the method of any of clauses 1A-6A.

Clause 8A. The device of clause 7A, wherein the one or more means comprise one or more processors implemented in circuitry.

Clause 9A. The device of any of clauses 7A and 8A, further comprising a memory to store the video data.

Clause 10A. The device of any of clauses 7A-9A, further comprising a display configured to display decoded video data.

Clause 11A. The device of any of clauses 7A-10A, wherein the device comprises one or more of a camera, a computer, a mobile device, a broadcast receiver device, or a set-top box.

Clause 12A. The device of any of clauses 7A-11A, wherein the device comprises a video decoder.

Clause 13A. The device of any of clauses 7A-12A, wherein the device comprises a video encoder.

Clause 14A. A computer-readable storage medium having stored thereon instructions that, when executed, cause one or more processors to perform the method of any of clauses 1A-6A.

Clause 1B. A method of decoding video data, the method comprising: decoding at least a portion of a picture of video data; applying one or more adaptive loop filters (ALFs) to the at least portion of the picture during a first stage of ALF to produce filtered samples for the at least portion of the picture; determining whether to perform a second stage of ALF on the at least portion of the picture; when the determination is not to perform the second stage of ALF, avoiding decoding of filter coefficients for one or more ALFs for the second stage of ALF and avoiding performing the second stage of ALF on the at least portion of the picture; and using the filtered samples to produce final samples for the at least portion of the picture.

Clause 2B. The method of clause 1B, wherein using the filtered samples to produce the final samples comprises calculating the final samples according to $\tilde{R}(x, y) = \sum_{i=0}^{N_f - 1} w_i R'(x, y, i)$, wherein $\tilde{R}(x, y)$ represents one of the final samples at position (x, y), $w_i$ comprises a weight value for an $i^{th}$ ALF of the one or more ALFs, and R'(x, y, i) comprises one of the filtered samples produced by the ALF at the position (x, y).

Clause 3B. The method of clause 2B, further comprising determining the weight values $w_i$ from fixed configuration data.

Clause 4B. The method of clause 2B, further comprising determining the weight values $w_i$ from decoded filter usage information.

Clause 5B. The method of clause 2B, further comprising decoding the weight values $w_i$.

Clause 6B. The method of clause 5B, wherein decoding the weight values $w_i$ comprises decoding the weight values $w_i$ from one or more of a sequence parameter set (SPS), a picture parameter set (PPS), a slice header, a sub-picture header, a coding tree unit (CTU) header, a coding tree block (CTB) header, or a sub-block header.

Clause 7B. The method of any of clauses 2B-6B, further comprising decoding data for a syntax element representing a combination of the weight values $w_i$ to be used for one or more of the final samples.

Clause 8B. The method of any of clauses 1B-7B, wherein determining whether to perform the second stage of ALF comprises decoding data representing whether to perform the second stage of ALF.

Clause 9B. The method of clause 8B, wherein decoding the data representing whether to perform the second stage of ALF comprises decoding data of one or more of a sequence parameter set (SPS), a picture parameter set (PPS), a slice header, a sub-picture header, a coding tree unit (CTU) header, a coding tree block (CTB) header, or a sub-block header.

Clause 10B. The method of any of clauses 8B and 9B, wherein decoding the data representing whether to perform the second stage of ALF comprises decoding a value for a syntax element, the value indicating that the second stage of ALF is to be bypassed.

Clause 11B. The method of any of clauses 1B-7B, wherein determining whether to perform the second stage of ALF comprises adaptively deriving whether to perform the second stage of ALF according to previously decoded coding information.

Clause 12B. The method of clause 11B, wherein the previously decoded coding information comprises one or more of a quantization parameter (QP) for a block in the at least portion of the picture, a size of the block, or whether the block is predicted using intra-prediction or inter-prediction.

Clause 13B. The method of any of clauses 1B-12B, wherein using the filtered samples to produce the final samples comprises scaling the filtered samples to produce the final samples.

Clause 14B. The method of any of clauses 1B-13B, further comprising encoding the at least portion of the picture prior to decoding the at least portion of the picture.

Clause 15B. A device for decoding video data, the device comprising one or more means for performing the method of any of clauses 1B-14B.

Clause 16B. The device of clause 15B, wherein the one or more means comprise one or more processors implemented in circuitry.

Clause 17B. The device of any of clauses 15B and 16B, further comprising a display configured to display the decoded video data.

Clause 18B. The device of any of clauses 15B-17B, wherein the device comprises one or more of a camera, a computer, a mobile device, a broadcast receiver device, or a set-top box.

Clause 19B. The device of clause 15B-18B, further comprising a memory configured to store the video data.

Clause 20B. A computer-readable storage medium having stored thereon instructions that, when executed, cause a processor of a device for decoding video data to perform the method of any of clauses 1B-14B.

Clause 21B. A device for decoding video data, the device comprising: means for decoding at least a portion of a picture of video data; means for applying one or more adaptive loop filters (ALFs) to the at least portion of the picture during a first stage of ALF to produce filtered samples for the at least portion of the picture; means for determining whether to perform a second stage of ALF on the at least portion of the picture; means for avoiding decoding of filter coefficients for one or more ALFs for the second stage of ALF when the determination is not to perform the second stage of ALF; means for avoiding performing the second stage of ALF on the at least portion of the picture when the determination is not to perform the second stage of ALF; and means for using the filtered samples to produce final samples for the at least portion of the picture.

Clause 1C. A method of decoding video data, the method comprising: applying a first stage adaptive loop filter (ALF) to a reconstructed sample of a reconstructed block, wherein applying the first stage ALF comprises: determining a first class index for the reconstructed sample; selecting a filter from a first set of filters based on the first class index; and applying the filter from the first set of filters to the reconstructed sample to determine a first intermediate sample value; applying a second stage ALF to the reconstructed sample, wherein applying the second stage ALF comprises: determining a second class index for the reconstructed sample; selecting a second filter from a second set of filters based on the second class index; applying the second filter to the reconstructed sample to determine a first sample modification value; determining a second sample modification value based on the first intermediate sample value; and determining a filtered reconstructed sample based on the reconstructed sample, the first sample modification value, and the second sample modification value.

Clause 2C. The method of clause 1C, wherein the first set of filters comprises fixed filters.

Clause 3C. The method of any of clauses 1C-2C, wherein the second set of filters comprises signaled filters determined based on syntax signaled in the video data.

Clause 4C. The method of any of clauses 1C-3C, wherein determining the first class index comprises: determining an activity value for the reconstructed sample; determining a direction for the reconstructed sample; and determining the first class index based on the activity value and the direction.

Clause 5C. The method of clause 4C, wherein determining the direction comprises assigning one of 56 values to the direction.

Clause 6C. The method of any of clauses 1C-5C, wherein the first set of filters includes a 9×9 diamond-shaped filter.

Clause 7C. The method of any of clauses 1C-6C, wherein determining the filtered reconstructed sample based on the reconstructed sample, the first sample modification value, and the second sample modification value comprises adding the first sample modification value and the second sample modification value to the reconstructed sample.

Clause 8C. The method of any of clauses 1C-7C, wherein determining the second sample modification value based on the first intermediate sample value comprises clipping the second sample modification value to determine a clipped sample modification value and adding the first sample modification value and the clipped sample modification value to the reconstructed sample.

Clause 9C. The method of clause 8C, further comprising: receiving, in the video data, the clipped sample modification value.

Clause 10C. The method of any of clauses 1C-9C, wherein determining the second sample modification value based on the first intermediate sample value comprises determining a difference between the reconstructed sample and the first intermediate sample value.

Clause 11C. The method of any of clauses 1C-10C, further comprising: selecting the first set of filters from a plurality of sets of fixed filters based on a quantization parameter for the reconstructed block.

Clause 12C. The method of any of clauses 1C-11C, wherein applying the first stage ALF further comprises determining a third class index for the reconstructed sample, selecting a third filter from a second set of filters based on the third class index; and applying the third filter from the second set of filters to the reconstructed sample to determine a second intermediate sample value; and applying the second stage ALF to the reconstructed sample further comprises determining the second sample modification value based on the first intermediate sample value and the second intermediate sample value.

Clause 13C. The method of any of clauses 1C-12C, further comprising: adding a predicted sample value to a residual sample value to determine the reconstructed sample.

Clause 14C. The method of any of clauses 13C, further comprising: applying a deblocking filter to a sum of the predicted sample value and the residual sample value to determine the reconstructed sample.

Clause 15C. The method of any of clauses 1C-14C, further comprising: outputting a decoded picture of the video data, wherein the decoded picture comprises the filtered reconstructed sample.

Clause 16C. The method of any of clauses 1C-14C, wherein the method of decoding is performed as part of a video encoding process.

Clause 17C. A device for decoding video data, the device comprising: a memory configured to store video data; one or more processors implemented in circuitry and configured to: apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

Clause 18C. The device of clause 17C, wherein the first set of filters comprises fixed filters.

Clause 19C. The device of any of clauses 17C-18C, wherein the second set of filters comprises signaled filters determined based on syntax signaled in the video data.

Clause 20C. The device of any of clauses 17C-19C, wherein to determine the first class index, the one or more processors are further configured to: determine an activity value for the reconstructed sample; determine a direction for the reconstructed sample; and determine the first class index based on the activity value and the direction.

Clause 21C. The device of clause 20C, wherein to determine the direction, the one or more processors are further configured to assign one of 56 values to the direction.

Clause 22C. The device of any of clauses 17C-21C, wherein the first set of filters includes a 9×9 diamond-shaped filter.

Clause 23C. The device of any of clauses 17C-22C, wherein to determine the filtered reconstructed sample based on the reconstructed sample, the first sample modification value, and the second sample modification value, the one or more processors are further configured to add the first sample modification value and the second sample modification value to the reconstructed sample.

Clause 24C. The device of any of clauses 17C-23C, wherein to determine the second sample modification value based on the first intermediate sample value, the one or more processors are further configured to clip the second sample modification value to determine a clipped sample modification value and adding the first sample modification value and the clipped sample modification value to the reconstructed sample.

Clause 25C. The device of clause 24C, wherein the one or more processors are further configured to: receive, in the video data, the clipped sample modification value.

Clause 26C. The device of any of clauses 17C-25C, wherein to determine the second sample modification value based on the first intermediate sample value, the one or more processors are further configured to determine a difference between the reconstructed sample and the first intermediate sample value.

Clause 27 C. The device of any of clauses 17C-26C, wherein the one or more processors are further configured to: select the first set of filters from a plurality of sets of fixed filters based on a quantization parameter for the reconstructed block.

Clause 28C. The device of any of clauses 17C-27C, wherein to apply the first stage ALF, the one or more processors are further configured to determine a third class index for the reconstructed sample, select a third filter from a second set of filters based on the third class index, and apply the third filter from the second set of filters to the reconstructed sample to determine a second intermediate sample value; to apply the second stage ALF to the reconstructed sample, the one or more processors are further configured to determine the second sample modification value based on the first intermediate sample value and the second intermediate sample value.

Clause 29C. The device of any of clauses 17C-28C, wherein the one or more processors are further configured to: add a predicted sample value to a residual sample value to determine the reconstructed sample.

Clause 30C. The device of clause 28C, wherein the one or more processors are further configured to: apply a deblocking filter to a sum of the predicted sample value and the residual sample value to determine the reconstructed sample.

Clause 31C. The device of any of clauses 17C-30C, wherein the one or more processors are further configured to: output a decoded picture of the video data, wherein the decoded picture comprises the filtered reconstructed sample.

Clause 32C. The device of any of clauses 17C-31C, wherein the device comprises a video encoding device.

Clause 33C. The device of any of clauses 17C-32C, wherein the one or more processors are further configured to: output a decoded picture of the video data, wherein the decoded picture comprises the filtered reconstructed sample.

Clause 34C. The device of clause 33C, wherein the device comprises a wireless communication device, further comprising a receiver configured to receive encoded video data.

Clause 35C. The device of clause 34C, wherein the wireless communication device comprises a telephone handset and wherein the receiver is configured to demodulate, according to a wireless communication standard, a signal comprising the encoded video data.

Clause 36C. The device of any of clauses 17C-35C, further comprising: a display configured to display decoded video data.

Clause 37C. The device of any of clauses 17C-36C, wherein the device comprises one or more of a camera, a computer, a mobile device, a broadcast receiver device, or a set-top box.

Clause 38C. The device of any of clauses 17C-37C, wherein the device comprises a video encoding device.

Clause 39C. A computer-readable storage medium storing instructions that when executed by one or more processors cause the one or more processors to: apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

Clause 1D. A method of decoding video data, the method comprising: applying a first stage adaptive loop filter (ALF) to a reconstructed sample of a reconstructed block, wherein applying the first stage ALF comprises: determining a first class index for the reconstructed sample; selecting a filter from a first set of filters based on the first class index; and applying the filter from the first set of filters to the reconstructed sample to determine a first intermediate sample value; applying a second stage ALF to the reconstructed sample, wherein applying the second stage ALF comprises: determining a second class index for the reconstructed sample; selecting a second filter from a second set of filters based on the second class index; applying the second filter to the reconstructed sample to determine a first sample modification value; determining a second sample modification value based on the first intermediate sample value; and determining a filtered reconstructed sample based on the reconstructed sample, the first sample modification value, and the second sample modification value.

Clause 2D. The method of clause 1D, wherein the first set of filters comprises fixed filters.

Clause 3D. The method of clause 1D, wherein the second set of filters comprises signaled filters determined based on syntax signaled in the video data.

Clause 4D. The method of clause 1D, wherein determining the first class index comprises: determining an activity value for the reconstructed sample; determining a direction for the reconstructed sample; and determining the first class index based on the activity value and the direction.

Clause 5D. The method of clause 4D, wherein determining the direction comprises assigning one of 56 values to the direction.

Clause 6D. The method of clause 1D, wherein the first set of filters includes a 9×9 diamond-shaped filter.

Clause 7D. The method of clause 1D, wherein determining the filtered reconstructed sample based on the reconstructed sample, the first sample modification value, and the second sample modification value comprises adding the first sample modification value and the second sample modification value to the reconstructed sample.

Clause 8D. The method of clause 1D, wherein determining the second sample modification value based on the first intermediate sample value comprises clipping the second sample modification value to determine a clipped sample modification value and adding the first sample modification value and the clipped sample modification value to the reconstructed sample.

Clause 9D. The method of clause 8D, further comprising: receiving, in the video data, the clipped sample modification value.

Clause 10D. The method of clause 1D, wherein determining the second sample modification value based on the first intermediate sample value comprises determining a difference between the reconstructed sample and the first intermediate sample value.

Clause 11D. The method of clause 1D, further comprising: selecting the first set of filters from a plurality of sets of fixed filters based on a quantization parameter for the reconstructed block.

Clause 12D. The method of clause 1D, wherein applying the first stage ALF further comprises determining a third class index for the reconstructed sample; selecting a second filter from a second set of filters based on the third class index; and applying the second filter from the second set of filters to the reconstructed sample to determine a second intermediate sample value; and applying the second stage ALF to the reconstructed sample further comprises determining the second sample modification value based on the first intermediate sample value and the second intermediate sample value.

Clause 13D. The method of clause 1D, further comprising: adding a predicted sample value to a residual sample value to determine the reconstructed sample.

Clause 14D. The method of clause 13D, further comprising: applying a deblocking filter to a sum of the predicted sample value and the residual sample value to determine the reconstructed sample.

Clause 15D. The method of clause 1D, further comprising: outputting a decoded picture of the video data, wherein the decoded picture comprises the filtered reconstructed sample.

Clause 16D. The method of clause 1D, wherein the method of decoding is performed as part of a video encoding process.

Clause 17D. A device for decoding video data, the device comprising: a memory configured to store video data; one or more processors implemented in circuitry and configured to: apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

Clause 18D. The device of clause 17D, wherein the first set of filters comprises fixed filters.

Clause 19D. The device of clause 17D, wherein the second set of filters comprises signaled filters determined based on syntax signaled in the video data.

Clause 20D. The device of clause 17D, wherein to determine the first class index, the one or more processors are further configured to: determine an activity value for the reconstructed sample; determine a direction for the reconstructed sample; and determine the first class index based on the activity value and the direction.

Clause 21D. The device of clause 20D, wherein to determine the direction, the one or more processors are further configured to assign one of 56 values to the direction.

Clause 22D. The device of clause 17D, wherein the first set of filters includes a 9×9 diamond-shaped filter.

Clause 23D. The device of clause 17D, wherein to determine the filtered reconstructed sample based on the reconstructed sample, the first sample modification value, and the second sample modification value, the one or more processors are further configured to add the first sample modification value and the second sample modification value to the reconstructed sample.

Clause 24D. The device of clause 17D, wherein to determine the second sample modification value based on the first intermediate sample value, the one or more processors are further configured to clip the second sample modification value to determine a clipped sample modification value and adding the first sample modification value and the clipped sample modification value to the reconstructed sample.

Clause 25D. The device of clause 24D, wherein the one or more processors are further configured to: receive, in the video data, the clipped sample modification value.

Clause 26D. The device of clause 17D, wherein to determine the second sample modification value based on the first intermediate sample value, the one or more processors are further configured to determine a difference between the reconstructed sample and the first intermediate sample value.

Clause 27D. The device of clause 17D, wherein the one or more processors are further configured to: select the first set of filters from a plurality of sets of fixed filters based on a quantization parameter for the reconstructed block.

Clause 28D. The device of clause 17D, wherein to apply the first stage ALF, the one or more processors are further configured to determine a third class index for the reconstructed sample, select a second filter from a second set of filters based on the third class index, and apply the second filter from the second set of filters to the reconstructed sample to determine a second intermediate sample value; to apply the second stage ALF to the reconstructed sample, the one or more processors are further configured to determine the second sample modification value based on the first intermediate sample value and the second intermediate sample value.

Clause 29D. The device of clause 17D, wherein the one or more processors are further configured to: add a predicted sample value to a residual sample value to determine the reconstructed sample.

Clause 30D. The device of clause 28D, wherein the one or more processors are further configured to: apply a deblocking filter to a sum of the predicted sample value and the residual sample value to determine the reconstructed sample.

Clause 31D. The device of clause 17D, wherein the one or more processors are further configured to: output a decoded picture of the video data, wherein the decoded picture comprises the filtered reconstructed sample.

Clause 32D. The device of clause 17D, wherein the device comprises a video encoding device.

Clause 33D. The device of clause 17D, wherein the one or more processors are further configured to: output a decoded picture of the video data, wherein the decoded picture comprises the filtered reconstructed sample.

Clause 34D. The device of clause 33D, wherein the device comprises a wireless communication device, further comprising a receiver configured to receive encoded video data.

Clause 35D. The device of clause 34D, wherein the wireless communication device comprises a telephone handset and wherein the receiver is configured to demodulate, according to a wireless communication standard, a signal comprising the encoded video data.

Clause 36D. The device of clause 17D, further comprising: a display configured to display decoded video data.

Clause 37D. The device of clause 17D, wherein the device comprises one or more of a camera, a computer, a mobile device, a broadcast receiver device, or a set-top box.

Clause 38D. The device of clause 17D, wherein the device comprises a video encoding device.

Clause 39D. A computer-readable storage medium storing instructions that when executed by one or more processors cause the one or more processors to: apply a first stage adaptive loop filter (ALF) to a reconstructed sample of a reconstructed block, wherein to apply the first stage ALF, the one or more processors are further configured to: determine a first class index for the reconstructed sample; select a filter from a first set of filters based on the first class index; and apply the filter from the first set of filters to the reconstructed sample to determine a first intermediate sample value; apply a second stage ALF to the reconstructed sample, wherein to apply the second stage ALF, the one or more processors are further configured to: determine a second class index for the reconstructed sample; select a second filter from a second set of filters based on the second class index; apply the second filter to the reconstructed sample to determine a first sample modification value; determine a second sample modification value based on the first intermediate sample value; and determine a filtered reconstructed sample based on the reconstructed sample, the first sample modification value, and the second sample modification value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    applying a first stage adaptive loop filter (ALF) to a reconstructed sample of a reconstructed block for a color component, wherein applying the first stage ALF comprises:
        determining a first class index for the reconstructed sample;
        selecting a filter from a first set of filters based on the first class index; and
        applying the filter from the first set of filters to the reconstructed sample to determine a first intermediate sample value;
    applying a second stage ALF to the reconstructed sample of the reconstructed block for the color component, wherein applying the second stage ALF comprises:
        determining a second class index for the reconstructed sample;
        selecting a second filter from a second set of filters based on the second class index;
        applying the second filter to the reconstructed sample to determine a first sample modification value;
        determining a second sample modification value based on a difference between the reconstructed sample and the first intermediate sample value; and
    determining a filtered reconstructed sample based on the reconstructed sample, the first sample modification value, and the second sample modification value.

2. The method of claim 1, wherein the first set of filters comprises fixed filters and the second set of filters comprises signaled filters determined based on syntax signaled in the video data.

3. The method of claim 1, wherein determining the first class index comprises:
    determining an activity value for the reconstructed sample;
    determining a direction for the reconstructed sample; and
    determining the first class index based on the activity value and the direction.

4. The method of claim 3, wherein determining the direction comprises assigning one of 56 values to the direction.

5. The method of claim 1, wherein determining the filtered reconstructed sample based on the reconstructed sample, the first sample modification value, and the second sample modification value comprises adding the first sample modification value and the second sample modification value to the reconstructed sample.

6. The method of claim 1, wherein determining the second sample modification value based on the first intermediate sample value comprises clipping the second sample modification value to determine a clipped sample modification value and adding the first sample modification value and the clipped sample modification value to the reconstructed sample.

7. The method of claim 6, further comprising:
receiving, in the video data, the clipped sample modification value.

8. The method of claim 1, further comprising:
selecting the first set of filters from a plurality of sets of fixed filters based on a quantization parameter for the reconstructed block.

9. The method of claim 1, wherein
applying the first stage ALF further comprises determining a third class index for the reconstructed sample, selecting a third filter from a third set of filters based on the third class index, and applying the third filter from the third set of filters to the reconstructed sample to determine a second intermediate sample value;
applying the second stage ALF to the reconstructed sample further comprises:
determining a third sample modification value based on the first intermediate sample value and the second intermediate sample value; and
determining the filtered reconstructed sample based on the reconstructed sample, the first sample modification value, the second sample modification value, and the third sample modification value.

10. The method of claim 1, further comprising:
adding a predicted sample value to a residual sample value to determine the reconstructed sample.

11. The method of claim 10, further comprising:
applying a deblocking filter to a sum of the predicted sample value and the residual sample value to determine the reconstructed sample.

12. The method of claim 1, further comprising:
outputting a decoded picture of the video data, wherein the decoded picture comprises the filtered reconstructed sample.

13. The method of claim 1, wherein the method of decoding is performed as part of a video encoding process.

14. A device for decoding video data, the device comprising:
a memory configured to store video data;
one or more processors implemented in circuitry and configured to:
apply a first stage adaptive loop filter (ALF) to a reconstructed sample of a reconstructed block for a color component, wherein to apply the first stage ALF, the one or more processors are further configured to:
determine a first class index for the reconstructed sample;
select a filter from a first set of filters based on the first class index; and
apply the filter from the first set of filters to the reconstructed sample to determine a first intermediate sample value;
apply a second stage ALF to the reconstructed sample of the reconstructed block for the color component, wherein to apply the second stage ALF, the one or more processors are further configured to:
determine a second class index for the reconstructed sample;
select a second filter from a second set of filters based on the second class index;
apply the second filter to the reconstructed sample to determine a first sample modification value;
determine a second sample modification value based on a difference between the reconstructed sample and the first intermediate sample value; and
determine a filtered reconstructed sample based on the reconstructed sample, the first sample modification value, and the second sample modification value.

15. The device of claim 14, wherein the first set of filters comprises fixed filters and the second set of filters comprises signaled filters determined based on syntax signaled in the video data.

16. The device of claim 14, wherein to determine the first class index, the one or more processors are further configured to:
determine an activity value for the reconstructed sample;
determine a direction for the reconstructed sample; and
determine the first class index based on the activity value and the direction.

17. The device of claim 16, wherein to determine the direction, the one or more processors are further configured to assign one of 56 values to the direction.

18. The device of claim 14, wherein to determine the filtered reconstructed sample based on the reconstructed sample, the first sample modification value, and the second sample modification value, the one or more processors are further configured to add the first sample modification value and the second sample modification value to the reconstructed sample.

19. The device of claim 14, wherein to determine the second sample modification value based on the first intermediate sample value, the one or more processors are further configured to clip the second sample modification value to determine a clipped sample modification value and adding the first sample modification value and the clipped sample modification value to the reconstructed sample.

20. The device of claim 19, wherein the one or more processors are further configured to:
receive, in the video data, the clipped sample modification value.

21. The device of claim 14, wherein the one or more processors are further configured to:
select the first set of filters from a plurality of sets of fixed filters based on a quantization parameter for the reconstructed block.

22. The device of claim 14, wherein
to apply the first stage ALF, the one or more processors are further configured to determine a third class index for the reconstructed sample, select a third filter from a third set of filters based on the third class index, and apply the third filter from the third set of filters to the reconstructed sample to determine a second intermediate sample value;
to apply the second stage ALF to the reconstructed sample, the one or more processors are further configured to:
determine a third sample modification value based on the first intermediate sample value and the second intermediate sample value; and
determine the filtered reconstructed sample based on the reconstructed sample, the first sample modification value, the second sample modification value, and the third sample modification value.

23. The device of claim 14, wherein the one or more processors are further configured to:
add a predicted sample value to a residual sample value to determine the reconstructed sample.

24. The device of claim 23, wherein the one or more processors are further configured to:
apply a deblocking filter to a sum of the predicted sample value and the residual sample value to determine the reconstructed sample.

25. The device of claim 14, wherein the one or more processors are further configured to:
output a decoded picture of the video data, wherein the decoded picture comprises the filtered reconstructed sample.

26. The device of claim 14, wherein the device comprises a video encoding device.

27. The device of claim 26, wherein the device comprises a wireless communication device, further comprising a receiver configured to receive encoded video data.

28. The device of claim 27, wherein the wireless communication device comprises a telephone handset and wherein the receiver is configured to demodulate, according to a wireless communication standard, a signal comprising the encoded video data.

29. The device of claim 14, further comprising:
a display configured to display decoded video data.

30. The device of claim 14, wherein the device comprises one or more of a camera, a computer, a mobile device, a broadcast receiver device, or a set-top box.

31. The device of claim 14, wherein the device comprises a video encoding device.

32. A non-transitory computer-readable storage medium storing instructions that when executed by one or more processors cause the one or more processors to:
apply a first stage adaptive loop filter (ALF) to a reconstructed sample of a reconstructed block for a color component, wherein to apply the first stage ALF, the one or more processors are further configured to:
determine a first class index for the reconstructed sample;
select a filter from a first set of filters based on the first class index; and
apply the filter from the first set of filters to the reconstructed sample to determine a first intermediate sample value;
apply a second stage ALF to the reconstructed sample of the reconstructed block for the color component, wherein to apply the second stage ALF, the one or more processors are further configured to:
determine a second class index for the reconstructed sample;
select a second filter from a second set of filters based on the second class index;
apply the second filter to the reconstructed sample to determine a first sample modification value;
determining a second sample modification value based on a difference between the reconstructed sample and the first intermediate sample value; and
determine a filtered reconstructed sample based on the reconstructed sample, the first sample modification value, and the second sample modification value.

33. The method of claim 1, wherein the second set of filters comprises filters signaled in the video data.

34. The method of claim 1, wherein determining the second sample modification value based on the first intermediate sample value comprises:
determining a third filter from the second set of filters;
applying the third filter to the first intermediate sample value to determine the second sample modification value.

35. The method of claim 1, wherein determining the second sample modification value based on the first intermediate sample value further comprises:
clipping the second sample modification value to determine a clipped sample modification value in response to the difference between the reconstructed sample and the first intermediate sample value being greater than a threshold value; and
adding the first sample modification value and the clipped sample modification value to the reconstructed sample.

36. The device of claim 14, wherein the second set of filters comprises filters signaled in the video data.

37. The device of claim 14, wherein to determine the second sample modification value based on the first intermediate sample value, the one or more processors are further configured to:
determine a third filter from the second set of filters;
apply the third filter to the first intermediate sample value to determine the second sample modification value.

38. The device of claim 14, wherein to determine the second sample modification value based on the first intermediate sample value, the one or more processors are further configured to:
clip the second sample modification value to determine a clipped sample modification value in response to the difference between the reconstructed sample and the first intermediate sample value being greater than a threshold value; and
add the first sample modification value and the clipped sample modification value to the reconstructed sample.

* * * * *